(12) United States Patent
Guriev

(10) Patent No.: US 12,442,387 B2
(45) Date of Patent: Oct. 14, 2025

(54) COMPRESSOR IMPELLER

(71) Applicant: Cummins Ltd, London (GB)

(72) Inventor: Oleg Guriev, Huddersfield (GB)

(73) Assignee: Cummins Ltd, London (GB)

( * ) Notice: Subject to any disclaimer, the term of this patent is extended or adjusted under 35 U.S.C. 154(b) by 0 days.

(21) Appl. No.: 18/699,560

(22) PCT Filed: Oct. 7, 2022

(86) PCT No.: PCT/GB2022/052552
§ 371 (c)(1),
(2) Date: Apr. 8, 2024

(87) PCT Pub. No.: WO2023/057774
PCT Pub. Date: Apr. 13, 2023

(65) Prior Publication Data
US 2024/0401606 A1    Dec. 5, 2024

(30) Foreign Application Priority Data
Oct. 8, 2021    (GB) ........................... 2114407

(51) Int. Cl.
*F04D 29/30* (2006.01)
*B33Y 80/00* (2015.01)
*F04D 17/10* (2006.01)
*F04D 29/28* (2006.01)

(52) U.S. Cl.
CPC ............. *F04D 29/30* (2013.01); *B33Y 80/00* (2014.12); *F04D 17/10* (2013.01); *F04D 29/284* (2013.01); *F05D 2220/40* (2013.01); *F05D 2230/20* (2013.01); *F05D 2240/305* (2013.01); *F05D 2250/712* (2013.01)

(58) Field of Classification Search
CPC ..... F04D 29/30; F04D 29/284; F05B 2220/40
See application file for complete search history.

(56) References Cited

U.S. PATENT DOCUMENTS

| 8,517,664 | B2 * | 8/2013 | Sun ......................... F04D 29/30 416/182 |
| 11,525,457 | B2 * | 12/2022 | Honda ................... F04D 29/384 |
| 2002/0187060 | A1 | 12/2002 | Decker | |
| 2011/0173975 | A1 | 7/2011 | Sun et al. | |

(Continued)

FOREIGN PATENT DOCUMENTS

| EP | 3412892 A1 | 12/2018 |
| EP | 3696425 A1 | 8/2020 |
| WO | 9831588 A1 | 7/1998 |

OTHER PUBLICATIONS

International Preliminary Report on Patentability received for PCT Patent Application No. PCT/GB2022/052552, Mailed on Apr. 18, 2024, 9 pages.

(Continued)

*Primary Examiner* — Sabbir Hasan
(74) *Attorney, Agent, or Firm* — Faegre Drinker Biddle & Reath LLP

(57) ABSTRACT

There is provided a centrifugal impeller for a compressor of a turbocharger. The impeller comprises a hub and a blade. The hub extends along an impeller axis. The blade extends from the hub. The blade defines a pressure surface and a suction surface. The pressure surface comprises a concave portion.

13 Claims, 24 Drawing Sheets

(56) References Cited

U.S. PATENT DOCUMENTS

2012/0328444 A1    12/2012  Sugimoto
2019/0271326 A1     9/2019  Cao et al.

OTHER PUBLICATIONS

International Search Report and Written Opinion for International patent application No. PCT/GB2022/052552 filed Oct. 7, 2022, mailed Jan. 4, 2023.

* cited by examiner

Figure 17
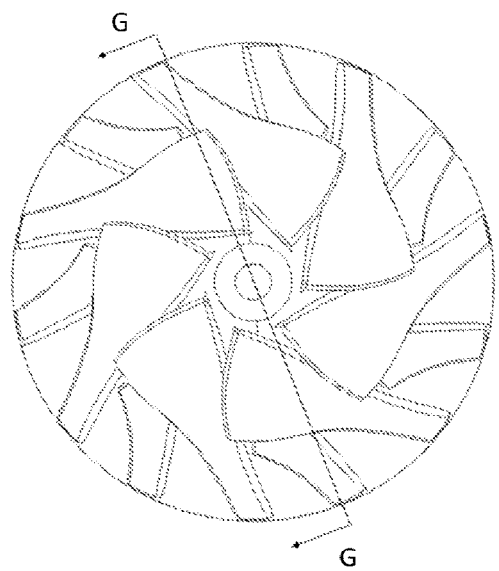
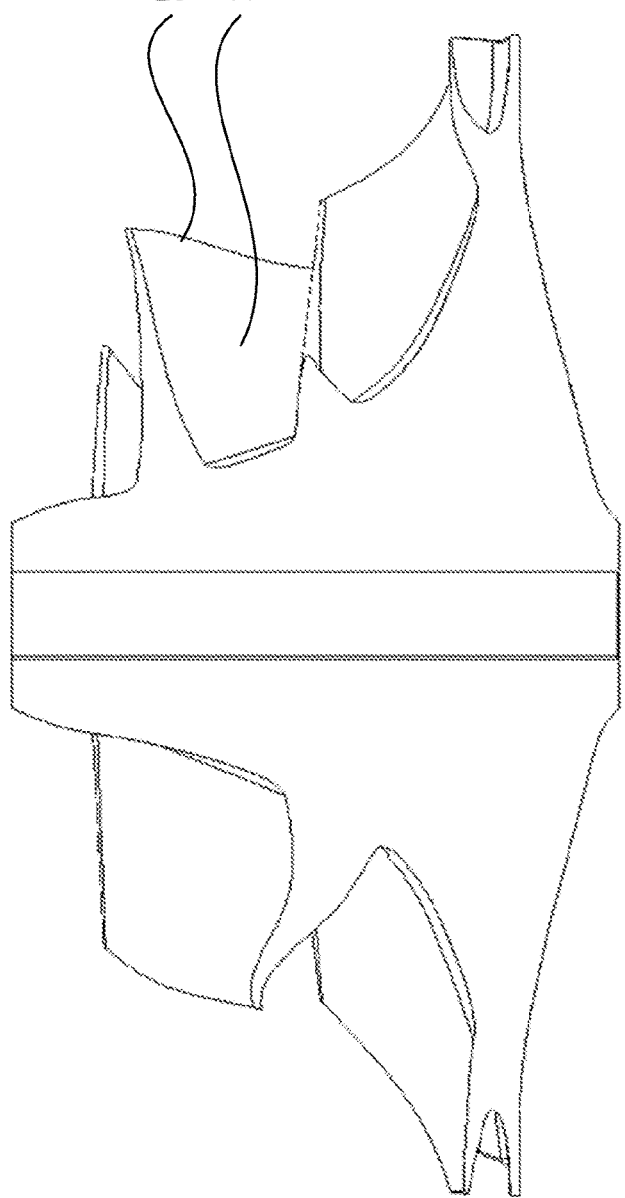
Figure 18

Figure 19
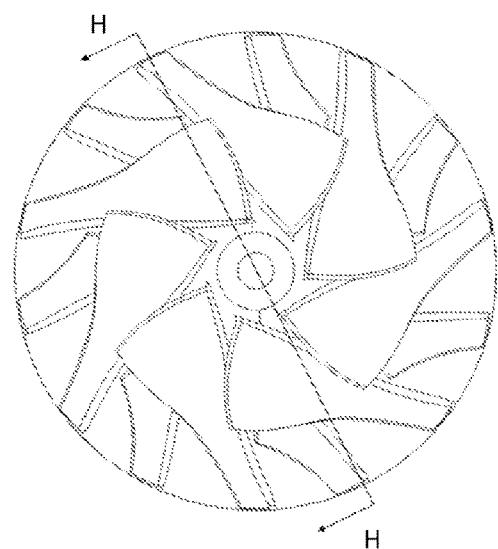
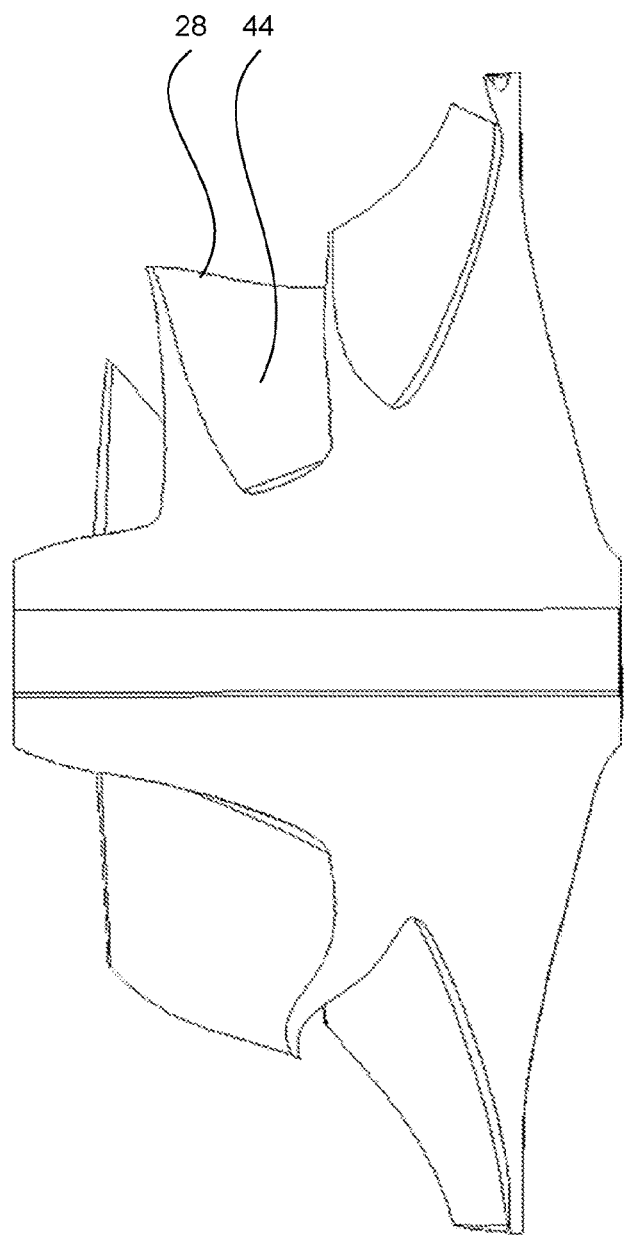
Figure 20

Figure 27
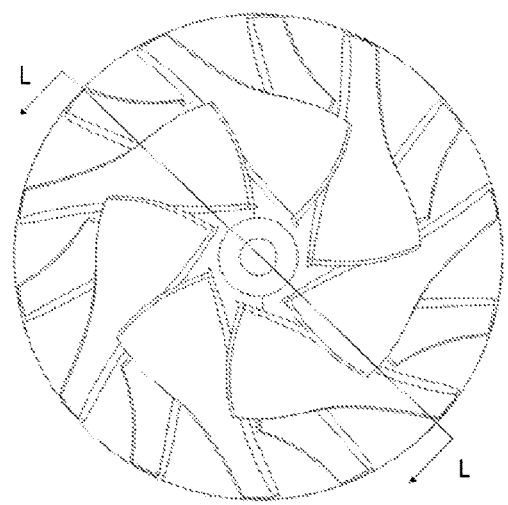
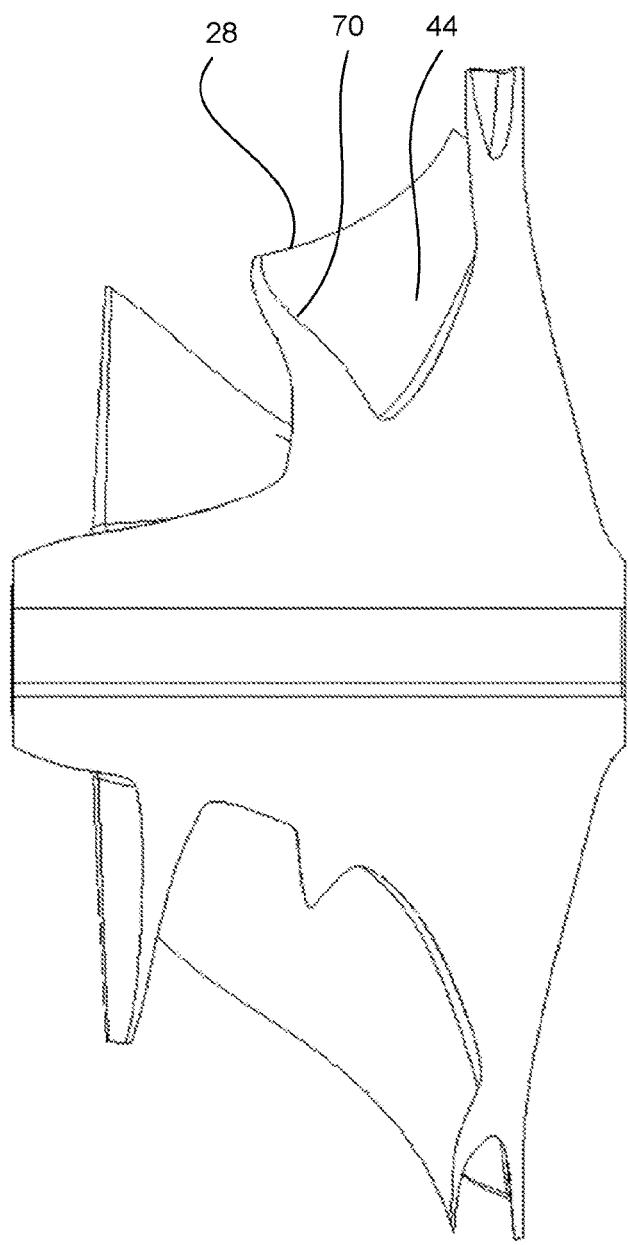
Figure 28

Figure 31
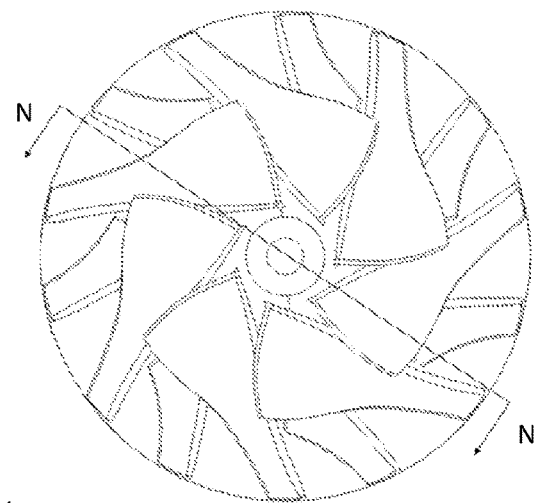
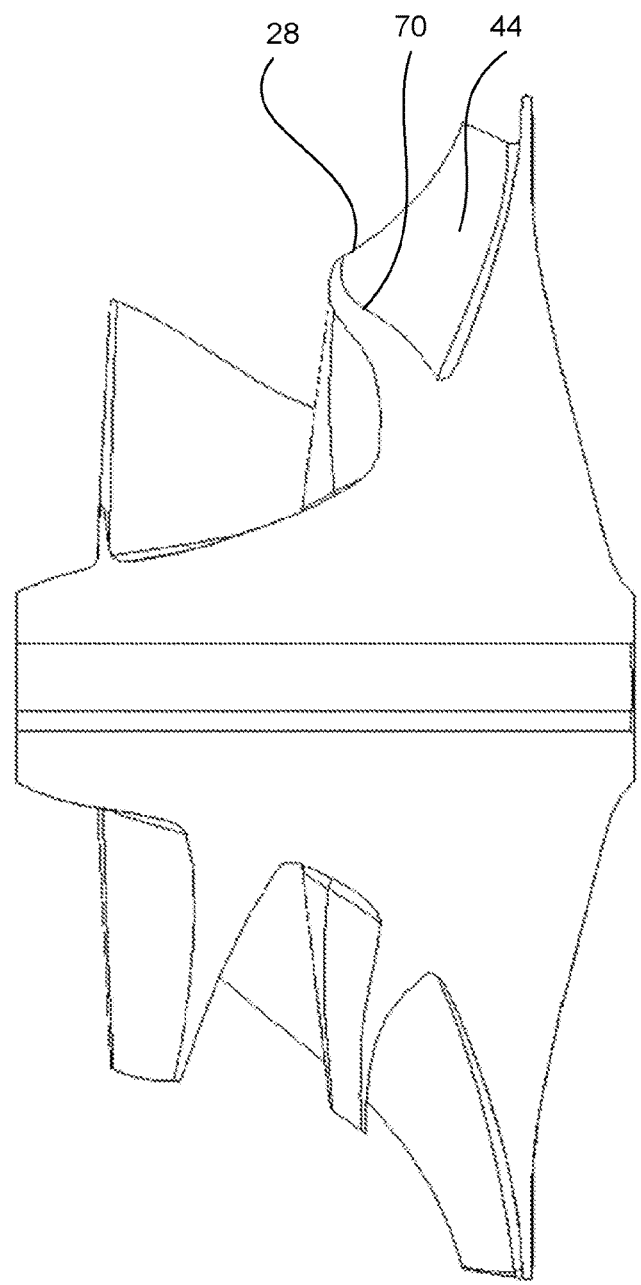
Figure 32

Figure 33
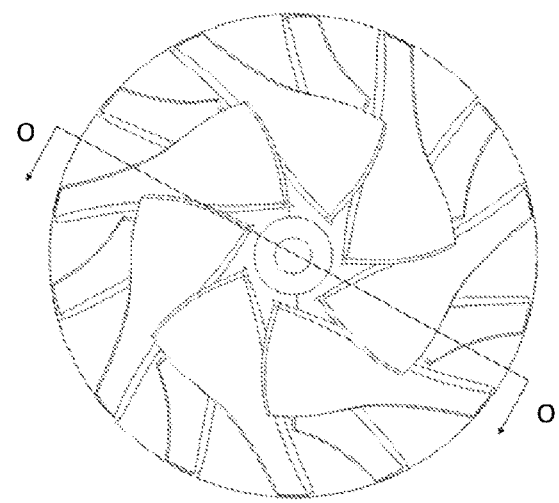
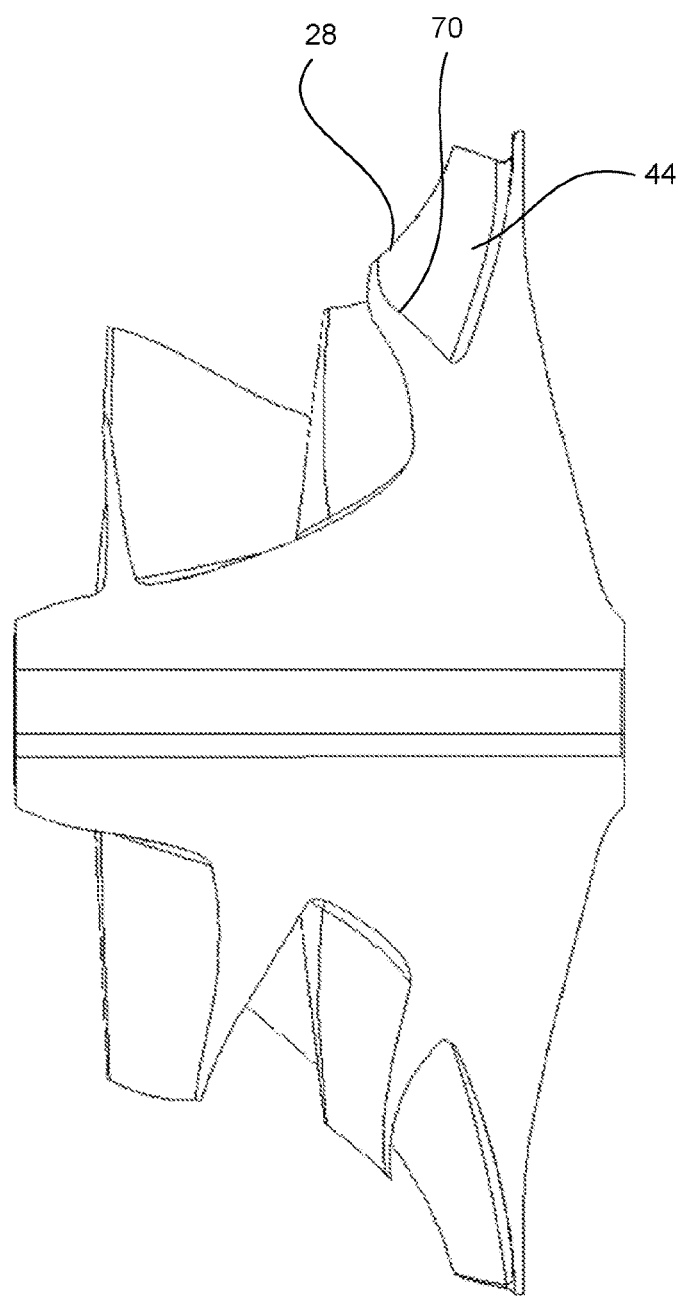
Figure 34

COMPRESSOR IMPELLER

CROSS-REFERENCE TO RELATED PATENT APPLICATIONS

This application claims priority to and is a U.S. national stage application of International Patent Application No. PCT/GB2022/052552, filed Oct. 7, 2022, which claims priority to GB Patent Application No. 2114407.6, filed on Oct. 8, 2021, the disclosures of which are hereby incorporated herein by reference in their entirety.

TECHNICAL FIELD

The present invention relates to a centrifugal impeller for a compressor of a turbocharger, and in particular to a centrifugal impeller having a concave portion on a pressure surface of a blade of the impeller.

BACKGROUND

Turbochargers are well-known devices for supplying air to the intake of an internal combustion engine at pressures above atmospheric pressure (boost pressures). A conventional turbocharger comprises an exhaust gas driven turbine impeller mounted on a rotatable shaft within a turbine housing. Rotation of the turbine impeller rotates a compressor impeller mounted on the other end of the shaft within a compressor housing. The compressor impeller delivers compressed air to the intake manifold of the engine, thereby increasing engine power. The turbocharger shaft is conventionally supported by journal and thrust bearings, including appropriate lubricating systems, located within a central bearing housing connected between the turbine and compressor housings.

Compressor impellers can be of a centrifugal or axial type. Axial compressor impellers receive intake air in an axial direction relative to the axis of rotation of the impeller, also called the impeller axis, and pass the compressed air on along the impeller axis. Axial compressor impellers comprise blades that impart a force on the intake air that deflects the air axially along the impeller axis. An example of an axial compressor is a fan, for example in an aircraft engine. Centrifugal compressor impellers, also known as radial compressor impellers, receive intake air in an axial direction along the shaft axis, and pass the compressed air on in a radial direction relative to the shaft axis. Centrifugal compressor impellers comprise blades that impart a centrifugal force on the intake air that compresses the intake air in a radially outwards direction. Centrifugal compressors often comprise housing defining an outlet in the shape of a volute, so as to collect the compressed air in a single conduit. An example of a centrifugal compressor is the compressor wheel of a turbocharger. The present invention concerns improvements to such centrifugal compressor impellers for turbochargers.

Traditionally, centrifugal compressor impeller blades were made so that each blade defined a generally straight profile in a plane normal to the impeller axis. That is to say, such that the cross-sectional profile of each blade relative to the impeller axis extends only in the radial direction, and does not diverge away from the radial direction. It has been well-documented that this geometry provides a high degree of compression (i.e. a high pressure ratio). Furthermore, because the blades are straight, the geometry is simple and cheap to manufacture. Straight blades are well-suited for applications where the engine system as a generally constant operating speed during use and therefore the power input delivered to the compressor remains generally constant, such as for example within aircraft or in power generation equipment. However, the drawback of such straight blade geometry is that the operating range of the compressor (i.e. the "map width" between the surge line and the choke line in a graphical comparison of mass flow to pressure ratio as commonly used in the art) is relatively narrow.

In order to increase the operating range of such an impeller, it is known to modify the profile of the blades so that they are "back-swept" in relation to the direction of rotation of the impeller. That is to say, the cross-sectional profile of each blade relative to the impeller axis diverges away from the radial direction in a direction opposite the direction of rotation. In such impellers, the pressure surfaces of the blades (i.e. the surfaces facing in the direction of rotation) are convexly shaped, such that they appear to sweep backwards compared to the direction of rotation. Whilst such back-swept blades increase the operating range of the compressor, this comes at the cost of reduced compression, and therefore back-swept blades exhibit a lower compression ratio than straight blades. Back-swept impellers are therefore most suitable for use in applications where the engine system is operated across a wide range of different engine speeds and therefore where the power delivered to the impeller will vary during use. This makes such back-swept impellers particularly useful in turbocharged engine systems for vehicles, since the power delivery to the compressor will vary depending upon the operation of the internal combustion engine.

As described above, during use, when the impeller rotates, the pressure surface imparts a centrifugal force on the intake air. The intake air travels along the pressure surface in a radially outwards direction, and as such some of the intake air will be pushed towards the blade-tip. In order to prevent air spilling over the blade-tips, known as over-tip leakage, centrifugal compressor impellers are typically contained within a housing comprising a shroud that closely follows the geometry of the blade-tip. However, in order to enable the impeller rotate freely within the housing, it is necessary to provide a clearance (i.e. a small gap) between the blade-tips and the shroud. In addition the centrifugal and compressive forces applied by the pressure surface of the blades, the suction surface will also generate a localised region of low pressure. During use, the pressure imbalance between the pressure and suction sides of the blades will cause intake air to spill over the blade-tips. In addition, the intake air that has been pushed radially outwards to the blade-tips will experience a frictional shearing force applied by the shroud in a direction opposite to the direction of rotation of the impeller. This frictional force causes some of the intake air to spill over the blade-tips, although this is a relatively small contributing factor to over-tip leakage compared to the pressure imbalance described above. The spilled air is not compressed to the same extent as the air that does not spill, and also creates turbulence in the flow paths between each pair of blades that impedes flow therethrough. Over-tip leakage is therefore known to reduce the efficiency of the compressor.

It is an object of the present invention to provide a higher efficiency compressor impeller by reducing over-tip leakage. It is a further object of the invention to obviate or mitigate one or more disadvantages apparent in the prior art, whether described herein or elsewhere.

SUMMARY

According to a first aspect of the invention, there is provided a centrifugal impeller for a compressor of a turbocharger, the impeller comprising: a hub extending along an impeller axis; and a blade extending from the hub, the blade defining a pressure surface and a suction surface; wherein the pressure surface comprises a concave portion.

During use, when the impeller rotates, the pressure surface imparts a centrifugal force on the intake air. The intake air travels along the pressure surface in a radially outwards direction from the blade-root (i.e. the portion of the blade attached to the hub) to the trailing edge. A small proportion of the intake air will pass into the clearance between the blade-tip and the shroud. The pressure differential between the suction and pressure sides of the blade and the frictional force applied on the air by the shroud remains approximately the same as it would be in a conventional backswept compressor impeller. Accordingly, there is a propensity for air to be drawn through the clearance from the pressure side to the suction side of the blade. However, because the pressure surface of the impeller of the present invention comprises a concave portion, the momentum of the intake air is directed in a forwards direction relative to the direction of rotation. When the air passes radially beyond the blade-tip and into the clearance between the blade-tip and the shroud, the air contains a large amount of momentum in the forward direction. The air therefore has increased momentum opposite the direction of spilling, and accordingly less intake air is spilled over the blade-tip. Additionally, because the concave portion of the pressure surface changes the direction of momentum of the intake air passing over it, the concave portion acts to acts to locally accelerate the flow in this region. The pressure of the intake air passing over the concave portion is therefore reduced, thus lessening the pressure imbalance between the pressure and section sides of the blade. As a result, over-tip leakage is reduced and the overall efficiency of the compressor is improved.

The term "hub" encompasses the central portion of the impeller from which the blades extend. The hub may form part of or be mounted to a turbocharger shaft which receives a rotational input from a turbine. The term "pressure surface" encompasses the surface of the blade that imparts a centrifugal compression force onto intake air. The pressure surface is, in particular, the surface of the blade facing in the direction of rotation of the impeller during use. The term "suction surface" encompasses the opposite surface of the blade to the pressure surface, and therefore faces opposite to the direction of rotation during use. In contrast to the pressure surface, during use the suction surface does not impart a centrifugal compression force onto the intake air and instead creates a small region of reduced pressure which acts to draw more intake air from the inlet of the compressor. The term "concave portion" encompasses a portion of the pressure surface of the blade that curves inwards relative to the pressure surface itself. The concave portion of the pressure surface may be, in particular, a portion of the pressure surface that is to some extent rounded like the bottom of a bowl such that it acts to contain fluid and/or deflect fluid towards the direction of rotation of the impeller. The blade may define a profile in a plane normal to the impeller axis, and the concave portion may be concave in the plane. That is to say, the concave portion may be observable in a plane normal to the impeller axis.

The blade may define a leading edge and a trailing edge, and the pressure surface may define a stream-wise contour extending between the leading edge and the trailing edge, the stream-wise contour may define a stream-wise contour length, and the concave portion may be at least partially positioned within a region extending from a first position of the stream-wise contour to a second position of the stream-wise contour, the first position of the stream-wise contour being spaced from the leading edge by at least around 10% of the stream-wise contour length and the second position of the stream-wise contour being spaced from the leading edge by at most around 90% of the stream-wise contour length. As such, the concave portion is constrained approximately to the middle part of the stream-wise length of the blade between the leading and trailing edges. This enables the portion of the blade at the leading edge and the portion of the blade at the trailing edge to be made in a conventional manner, and in particular to have a conventional back-swept geometry. This minimises disturbances at the leading and trailing edges, whilst reducing tip leakage in the middle portion of the blade.

The term "stream-wise contour" encompasses a contour line of the pressure surface of the blade extending from the leading edge to the trailing edge. The concave portion may be entirely contained within a region extending from the first position of the stream-wise contour to the second position of the stream-wise contour. The first position of the stream-wise contour may be spaced from the leading edge by at least around 20% or around 30% of the stream-wise contour length and the second position of the stream-wise contour may be spaced from the leading edge by at most around 70% or around 80% of the stream-wise contour length. Optionally, no part of the pressure surface of the blade is concave between the first position of the stream-wise contour and the leading edge and optionally no part of the pressure surface is concave between the second position of the stream-wise contour and the trailing edge. In further embodiments, at least part of the pressure surface of the blade between the first position of the stream-wise contour and the leading edge is back-swept and at least part of the pressure surface of the blade between the second position of the stream-wise contour and the trailing edge is back-swept.

The blade may define a blade-root and a blade-tip, and the pressure surface may define a span-wise contour extending between the blade-root and the blade-tip, the span-wise contour defining a span-wise contour length and the concave portion may be at least partially positioned within a region extending from a first position of the span-wise contour to the blade-tip, the first position of the span-wise contour being spaced from the blade-root by at least around 40% of the span-wise contour length. The concavity is therefore positioned closer to the blade-tip than the blade-root. As such, the concavity is able to deflect the intake air passing over the pressure surface towards the direction of rotation at the blade-tip. The term "blade-root" encompasses the portion of the blade attached to the hub. The term "blade-tip" encompasses the radially outermost part of the blade extending between the leading edge and the trailing edge. The concave portion may be entirely contained within a region extending from the first position of the span-wise contour to the blade-tip. The first position of the span-wise contour may be spaced from the blade-root by at least around 50% or around 60% of the span-wise contour length. Optionally, no part of the pressure surface is concave between the blade-root and the first position of the span-wise contour. In further embodiments, at least part of the pressure surface of the blade between the blade-root and the first position of the span-wise contour is back-swept.

The blade may define a blade-root and a blade-tip and may further define a profile in a plane normal to the impeller axis, and the profile may define a distribution of lean angles measured between a tangent of a point on the pressure surface of the blade and a radial direction originating at the impeller axis, the lean angle being positive in the direction of rotation of the impeller and negative opposite the direction of rotation of the impeller, and the distribution of lean angles may transition from a negative direction at the blade-root to a positive direction at the blade-tip. That is to say, the lean angle at the blade-root may be negative and the lean angle at the blade-tip may be positive. The lean angles along the profile from the blade-root to the blade-tip transition from negative to positive. Because the lean angle at the blade-root is negative, the portion of the profile nearest to the hub is generally back-swept. This provides the same advantages as a conventionally back-swept impeller, for example improved operating range (compressor map width). Accordingly, the impeller is suitable for use in applications which require wide operating ranges, such as in turbocharged vehicle engine systems. However, because the lean angle at the blade-tip is positive, the impeller exhibits reduced over-tip leakage and is therefore more efficient than a conventionally back-swept impeller. The lean angle may be between around 3° in the positive direction to around 10° in the positive direction, or more preferably between around 5° in the positive direction to around 8° in the positive direction, or more preferably between around 6° in the positive direction to around 7° in the positive direction, or most preferably around 6.5° in the positive direction.

The blade may define a blade-tip and a blade-root and a profile in a plane normal to the impeller axis; the profile of the concavity may define a depth in the plane normal to the impeller axis, the depth being measured between a chord mutually tangent to the blade-tip and a forward-most point of the pressure surface relative to a direction of rotation of the impeller about the impeller axis, and a bottom of the concavity in a direction normal to the tangent; and the depth of the concavity may be at most around 7% or around 5% or around 4% of a length of the profile in the plane normal to the impeller axis, the length of the profile being measured from the blade-root to the blade-tip. In such context, the bottom of the concavity is the point of the concavity in the plane normal to the impeller axis that is furthest away from the tangent. It has been found that by controlling the depth of the concavity so that it is within the ranges stated above, the risk of the boundary layer passing over the pressure surface separating from the pressure surface is reduced or avoided.

The suction surface of the blade may comprise a convex portion. The suction surface may be correspondingly shaped to the pressure surface, such that the convex portion of the suction surface generally mirrors the concave portion of the pressure surface. Because the suction surface and the pressure surface have corresponding shapes the blade does not reduce in thickness in the region of the concave portion. This avoids local regions of weakness and ensure that the internal stresses induced in the blade during operation are better distributed and that the life of the blade is improved.

The impeller may define an inducer and an exducer, and the blade may be a main-blade extending from the inducer to the exducer. In this context, such a "main-blade" encompasses a blade that has a leading edge that defines the most upstream point of the blades of the impeller. That is to say, a main-blade is a blade which runs from the foremost part of the impeller to the rearmost part of the impeller relative to the direction of flow therethrough. The impeller may comprise multiple main-blades. The impeller may further comprise a splitter-blade extending from the hub, the splitter-blade may comprise a pressure surface and a suction surface, and the pressure surface of the splitter-blade may comprise a concave portion. In this context, a "splitter-blade" may be a blade which is shorter than a main-blade, such that it does not extend across as much of the impeller as the main-blade. In particular, a splitter-blade may be a blade that has a leading edge that is downstream of the leading edge of an adjacent main-blade. The trailing edges of the main-blades and splitter-blades may be positioned at the same location relative to the flow through the impeller, namely the exducer.

The splitter-blade may define a leading edge and a trailing edge, and the pressure surface of the splitter-blade may define a stream-wise contour extending between the leading edge of the splitter-blade and the trailing edge of the splitter-blade, the stream-wise contour of the splitter-blade defining a stream-wise contour length, and the concave portion of the splitter-blade may be at least partially positioned within a region extending from the leading edge of the splitter-blade to a first position of the stream-wise contour of the splitter-blade, the first position of the stream-wise contour of the splitter-blade being spaced from the leading edge of the splitter-blade by at most around 80% of the stream-wise contour length of the splitter-blade. The concave portion may be entirely contained within a region extending from the leading edge of the splitter-blade to the first position of the stream-wise contour.

The splitter-blade may define a blade-root and a blade-tip, and the pressure surface of the splitter-blade may define a span-wise contour extending between the blade-root of the splitter-blade and the blade-tip of the splitter-blade, and the concave portion of the splitter-blade may be at least partially positioned within a region extending from a first position of the span-wise contour to the blade-tip of the splitter-blade, the first position of the span-wise contour being spaced from the blade-root of the splitter-blade by at least around 50% of the span-wise contour length. The concave portion of the splitter blade may be entirely contained within a region extending from the first position of the span-wise contour to the blade-tip of the splitter-blade.

The impeller may comprise a plurality of main-blades equispaced relative to the impeller axis and a plurality of splitter-blades equispaced relative to the impeller axis, the main-blades and splitter-blades being arranged in an alternating fashion.

According to a second aspect of the invention, there is provide a compressor for a turbocharger, the compressor comprising an impeller according to the first aspect of the invention.

According to a third aspect of the invention, there is provided a computer program comprising computer executable instructions that, when executed by a processor, cause the processor to control an additive manufacturing apparatus to manufacture the impeller of the first aspect of the invention.

According to a fourth aspect of the invention, there is provided a method of manufacturing an impeller according to the first aspect of the invention via additive manufacturing, the method comprising: obtaining an electronic file representing a geometry of the impeller of the first aspect of the invention; and controlling an additive manufacturing apparatus to manufacture, over one or more additive manufacturing steps, the impeller according to the geometry specified in the electronic file.

BRIEF DESCRIPTION OF THE DRAWINGS

A detailed description of the invention is provide below with reference to the accompanying drawings, in which:

FIG. 17 shows an end view of the impeller;

FIG. 18 is a section view taken through the line G-G of FIG. 17;

FIG. 19 shows an end view of the impeller;

FIG. 20 is a section view taken through the line H-H of FIG. 19;

FIG. 27 shows an end view of the impeller;

FIG. 28 is a section view taken through the line L-L of FIG. 27;

FIG. 31 shows an end view of the impeller;

FIG. 32 is a section view taken through the line N-N of FIG. 31;

FIG. 33 shows an end view of the impeller;

FIG. 34 is a section view taken through the line O-O of FIG. 33;

DETAILED DESCRIPTION

Figure 1:
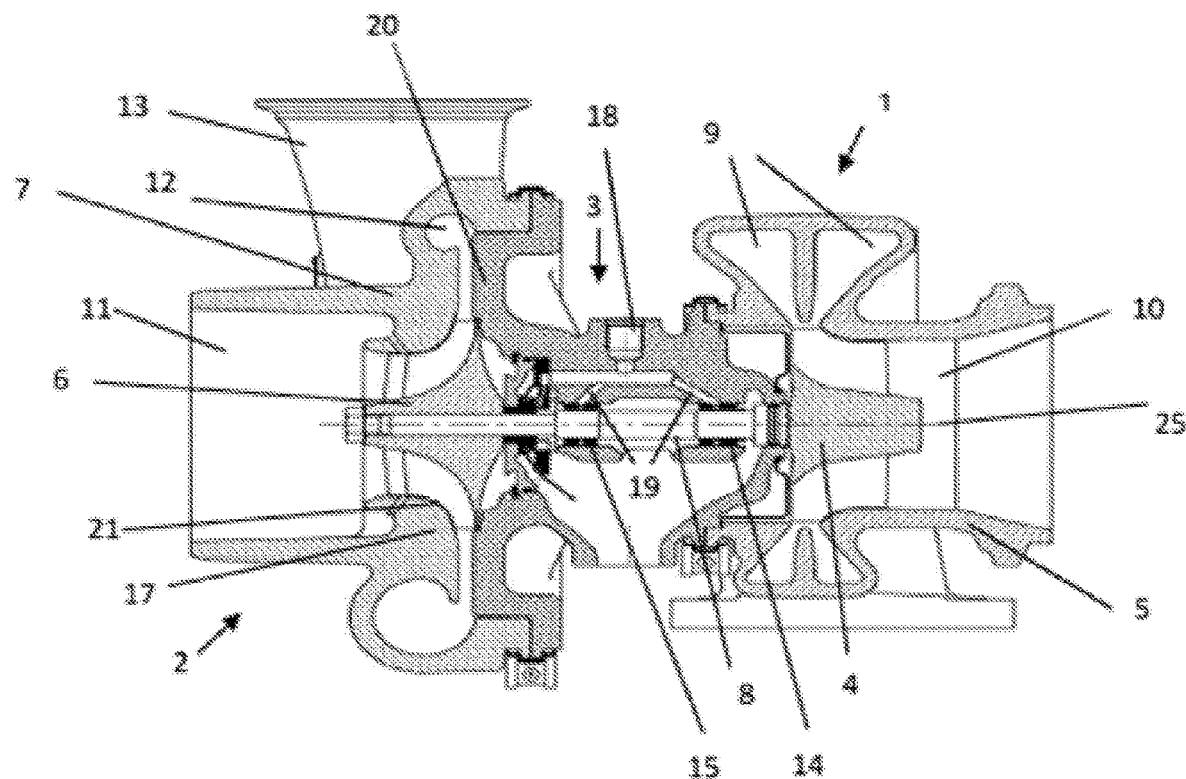
FIG. 1 is a cross-sectional drawing of a turbocharger.

FIG. 1 shows a schematic cross-section through a turbocharger. The turbocharger comprises a turbine 1 joined to a compressor 2 via a central bearing housing 3. The turbine 1 comprises a turbine impeller 4 for rotation within a turbine housing 5. Similarly, the compressor 2 comprises an impeller 6, of the centrifugal type, which can rotate within a compressor housing 7. The compressor housing 7 defines a compressor chamber within which the compressor wheel 6 can rotate. The turbine impeller 4 and compressor impeller 6 are mounted on opposite ends of a common turbocharger shaft 8 which extends through the central bearing housing 3.

The turbine housing 5 has at least one exhaust gas inlet volute 9 (in FIG. 1 two volutes are shown) located annularly around the turbine impeller 4, and an axial exhaust gas outlet 10. The compressor housing 7 has an axial air intake passage (compressor inlet) 11 and an outlet volute 12 arranged annularly around the compressor chamber. The outlet volute 12 is in gas flow communication with a compressor outlet 13 that delivers the compressed air onwards to an internal combustion engine (not shown).

The bearing housing 3 defines a bearing chamber through which the turbocharger shaft 8 passes. The shaft 8 is rotatably supported by a bearing assembly which comprises two journal bearings 14 and 15 housed towards the turbine end and compressor end respectively of the bearing housing 3. Oil is supplied to the bearing assembly from the oil system of the internal combustion engine via oil inlet 18 and is fed to the bearings 14, 15 by oil passageways 19. The oil fed to the bearings 14, 15 may be used to both lubricate the bearings and to remove heat from the bearings.

In use, the turbine impeller 4 is rotated about an axis 25 by the passage of exhaust gas from the exhaust gas inlet 9 to the exhaust gas outlet 10. Exhaust gas is provided to exhaust gas inlet 9 from an exhaust manifold (also referred to as an outlet manifold) of the engine. The turbine impeller 4 in turn rotates the compressor impeller 6 which thereby draws intake air through the compressor inlet 11 and delivers boost air to an inlet manifold of the engine via the volute 12 and then the outlet 13.

The compressor chamber is defined between a shroud portion 17 of the compressor housing 7 and a hub portion 20 of the bearing housing 3. The compressor housing 7 shown in FIG. 1 may be formed as a one-piece (i.e. integral) unit including the shroud portion 17, although in alternative embodiments may comprise multiple components. The shroud portion 17 has an inwardly facing shroud surface 21 which is circularly symmetric about the rotational axis 25.

Figure 2:
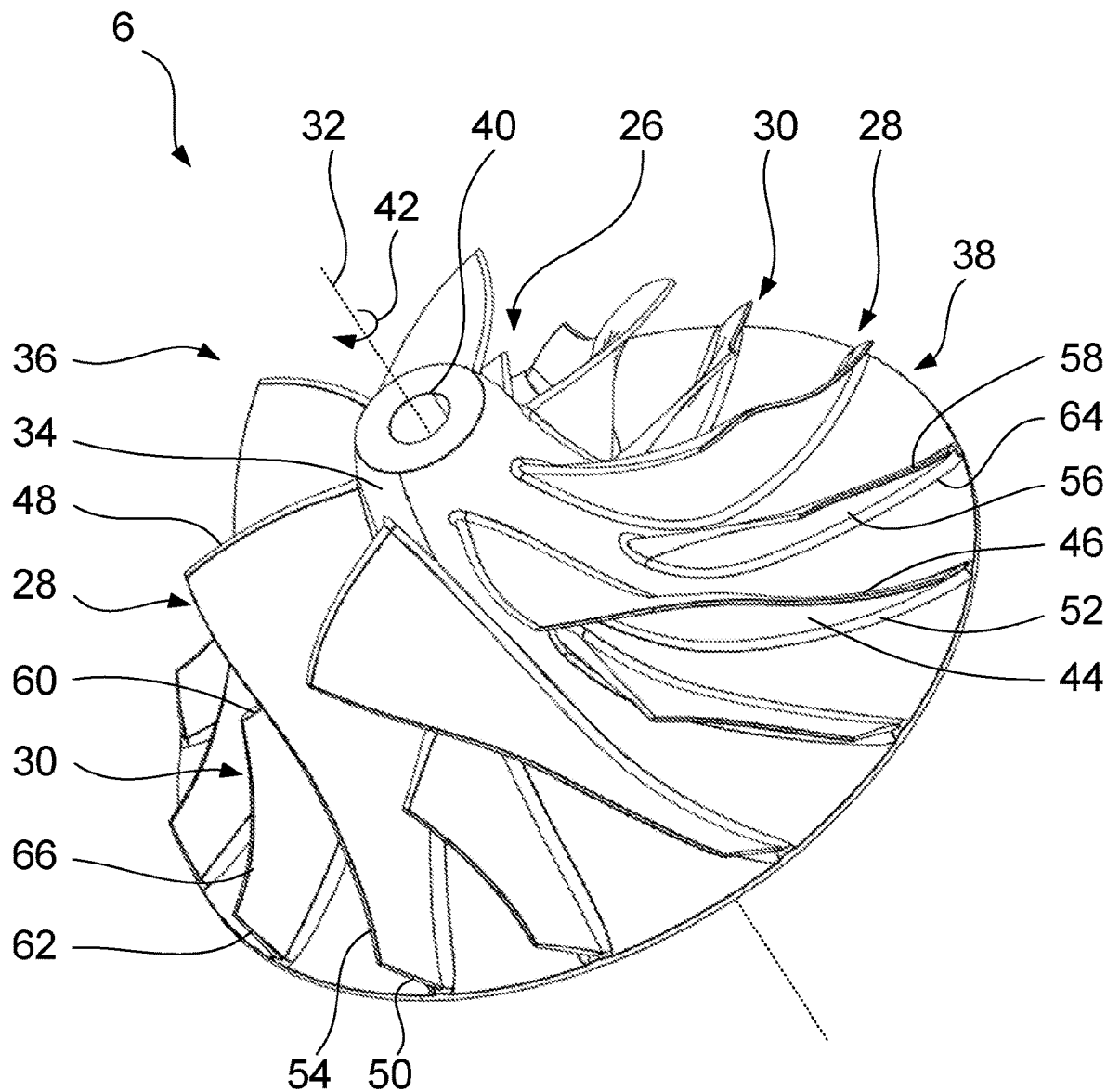
FIG. 2 is a perspective view of an impeller according to the present invention.
Figure 3:
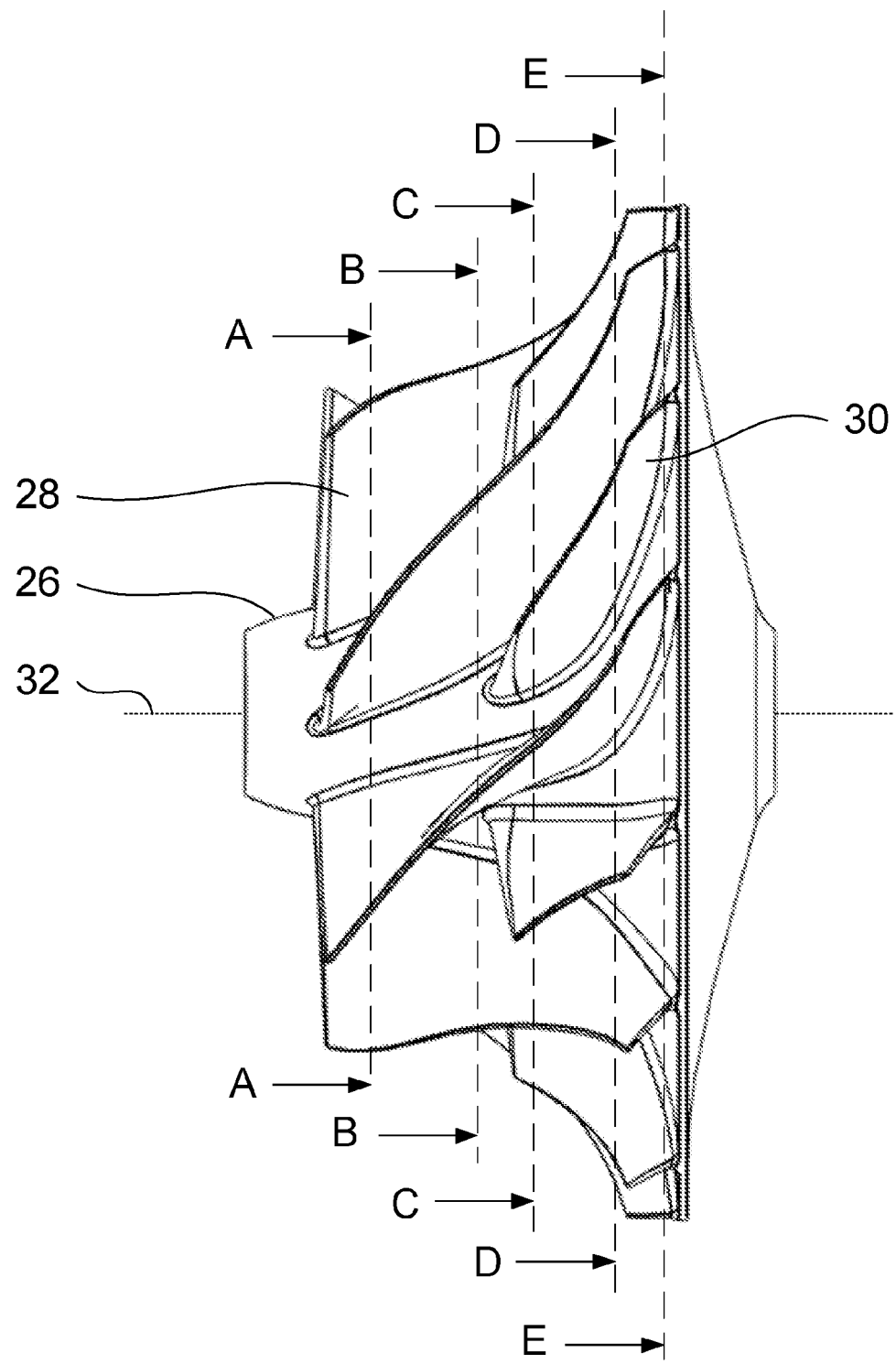
FIG. 3 is a side view of the impeller of the present invention.

FIGS. 2 and 3 show a centrifugal compressor impeller 6 according to the present invention. The impeller 6 comprises a hub 26, a plurality of main-blades 28, and a plurality of splitter-blades 30. The hub 26 extends along an impeller axis 32 about which it is generally symmetrical. In particular the hub 26 comprises an outer surface 34 that is generally horn-shaped and which increases in radius relative to the impeller axis 32 from an inducer portion 36 of the impeller 6 to an exducer portion 38 of the impeller 6. The hub 26 comprises a bore 40 coaxial with the impeller axis 32 that is configured to receive a portion of the turbocharger shaft 8. The impeller 6 may be rotationally fixed to the shaft 8 by a fastener, for example a wheel nut (not shown). However, in alternative embodiments the impeller 6 may be fixed to the shaft 8 in other ways. For example the impeller 6 may be a so-called "boreless impeller" which is connected to the shaft 8 via a threaded connection.

During use, the impeller 6 is driven in a clockwise direction as shown by the arrow 42, relative to the frame of reference of FIG. 2, about the impeller axis 32. The main-blades 28 each comprises a main-blade pressure surface 44 and a main-blade suction surface 46. The main-blade pressure surfaces 44 are the surfaces of the main-blades 28 that face in the direction of rotation 42 of the impeller 6 during use. That is to say, the main-blade pressure surfaces 44 are the surfaces of the main-blades 28 that are on the clockwise sides of the main-blades 28 in the frame of FIG. 2. During use, when the impeller 6 spins in the direction of rotation 42 about the impeller axis 24, the main-blade pressure surfaces 44 exert a compressive force on the air travelling through the impeller 6. The main-blade suction surfaces 46 are the surfaces of the main-blades 28 that face in the opposite direction to the direction of rotation 42. That is to say, the main-blade suction surfaces 46 are the surfaces of the main-blades 28 that are on the anti-clockwise sides of the main-blades 28 in the frame of FIG. 2. During use, the suction surfaces create localised regions of low pressure which act to draw air into the impeller 6.

The main-blades 28 each define a main-blade leading edge 48 and a main-blade trailing edge 50. The main-blade leading edges 48 are the edges of the each main-blade 28 at the inducer portion 36 of the impeller 6, and the main-blade trailing edges 50 are the edges of each main-blade 28 at the exducer portion 38 of the impeller 6. The main-blade leading edges 48 extend in a generally radial direction relative to the impeller axis 32, and the main-blade trailing edges 50 extend in a generally axial direction relative to the impeller axis 32. Accordingly, the intake air enters the impeller 6 in a generally axial direction relative to the impeller axis 32 and leaves the impeller 6 in a generally radial direction relative to the impeller axis 32. The outer surface 34 of the hub 26 is generally horn-shaped such that it smoothly transitions from extending in an axial direction relative to the impeller axis 32 at the inducer portion 36 to extending in a radial direction relative to the impeller axis 32 at the exducer portion 38. The horn-shaped geometry of the outer surface 34 thereby assists in redirecting the momentum of the intake air from the axial direction to the radial direction.

The main-blades 28 further comprise main-blade blade-roots 52 and main-blade blade-tips 54. The main-blade blade-roots 52 are the portions of the main-blades 28 which join the main-blades 28 to the hub 26. To help distribute internal stresses, the edge defined between the main-blades 28 and the outer surface 34 of the hub 26 may be radiused (i.e. filleted). The main-blade blade-tips 54 are the distal edges of the main-blades 28 relative to the outer surface 34 of the hub 26. The main-blade blade-tips 54 have a generally swept shape which conforms to the shape of the shroud portion 17 of the compressor housing 7. The main-blade blade-tips 54 define a meridionally extending edge that runs between the radially outermost part of the main-blade leading edges 48 and the axially forwardmost part of the main-blade trailing edges 50. As such, the main-blade blade-tips 54 may also be referred to as the main-blade meridional edges.

The splitter-blades 30 have generally the same construction as the main-blades 28 and operate under the same principles. In particular, each splitter-blade 30 comprises a splitter-blade pressure surface 56 and a splitter-blade suction surface 58 on opposite sides of the splitter-blades 30. The splitter-blades 30 further comprise splitter-blade leading edges 60 and splitter-blade trailing edges 62. Finally, the splitter-blades 30 comprise splitter-blade blade-roots 64 and splitter-blade blade-tips 66. The splitter-blades 30 differ from the main-blades 28 principally in that the splitter-blades 30 extend from the exducer portion 38 of the impeller 6 up to a position around halfway along the hub 26. As such, the splitter-blades 30 do not extend to the inducer portion 36 of the impeller 6. As shown in FIG. 2, due to the increasing radius of the hub 26 along the impeller axis 32, from the perspective of the intake air the distance between the main-blades 28 widens as the air passes through the impeller 6. The purpose of the splitter-blades 30 is to impart additional force onto the intake air by placing additional blades at the exducer end 38 of the impeller where the distance between the main-blades 28 has widened. To this end, the splitter-blades 30 are positioned between each pair of main-blades 28 such that the main-blades 28 and the splitter-blades 30 are arranged in an alternating fashion about the impeller axis 32. In some embodiments, the main-blades 28 and the splitter-blades 30 are equispaced, however in alternative embodiments the main-blades 28 and the splitter-blades 30 may be arranged with unequal spacing. The main-blades 28 and splitter-blades 30 are integrally formed with the hub 26, however in some embodiments the main-blades 28, splitter-blades 30 and the hub 26 may be non-integral.

Figure 4:
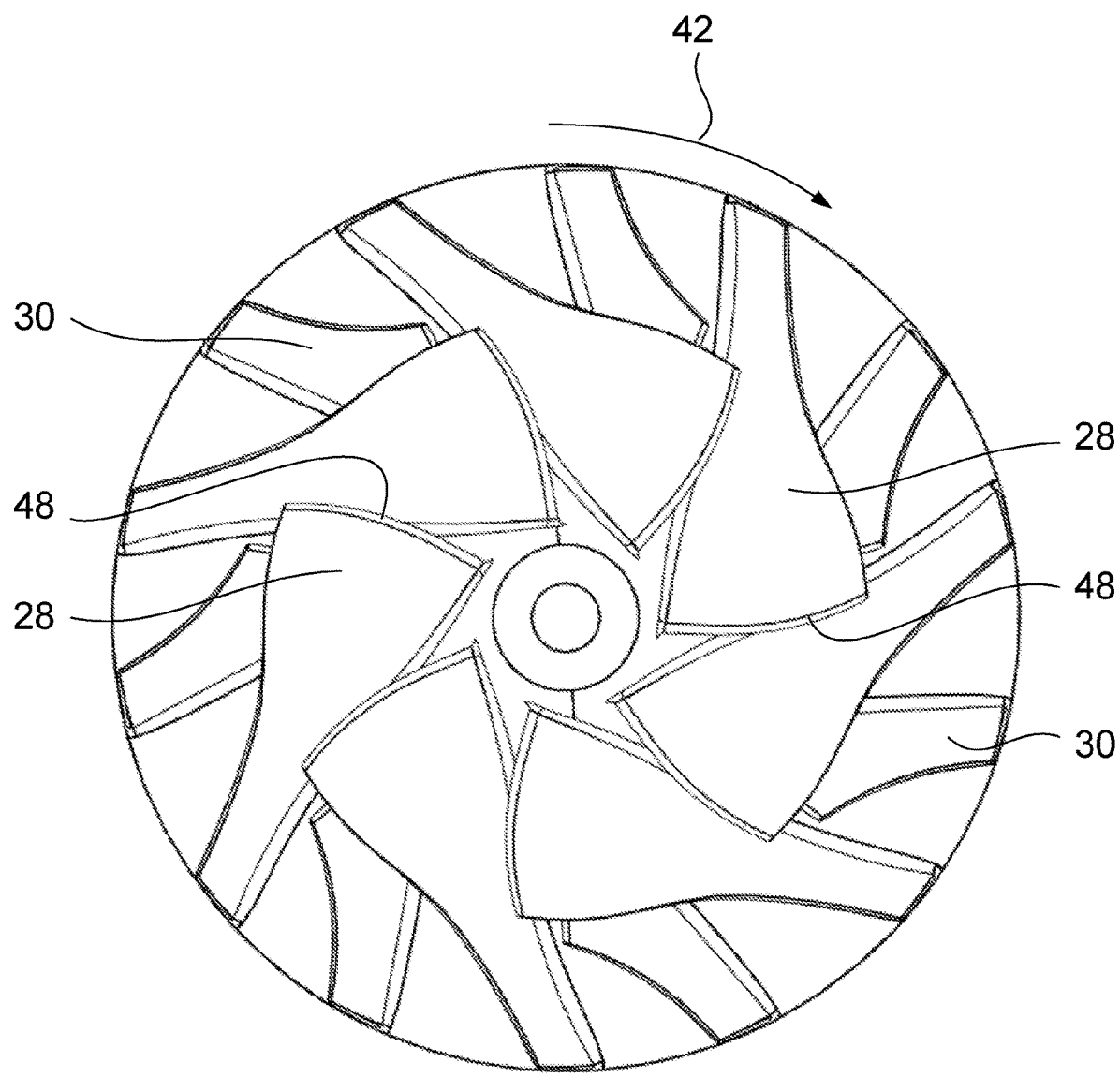
FIG. 4 is a front end view of the impeller of the present invention.

FIG. 4 shows an end view of the impeller 6 normal to the impeller axis 32 from the inducer side. As shown in the figure, the main-blade leading edges 48 define a profile in a plane normal to the impeller axis 32 that is generally curved in an opposite direction to the direction of rotation 42. That is to say, the profile of the main-blade leading edges 48 is curved in an anti-clockwise direction in the frame of FIG. 4. Accordingly, the main-blade leading edges 48 may be described as "back-swept". As described in the introduction, this type of blade geometry is conventional and is designed to increase the operating range of the compressor. In alternative embodiments the main-blade leading edges 48 may be straight.

Figure 5:
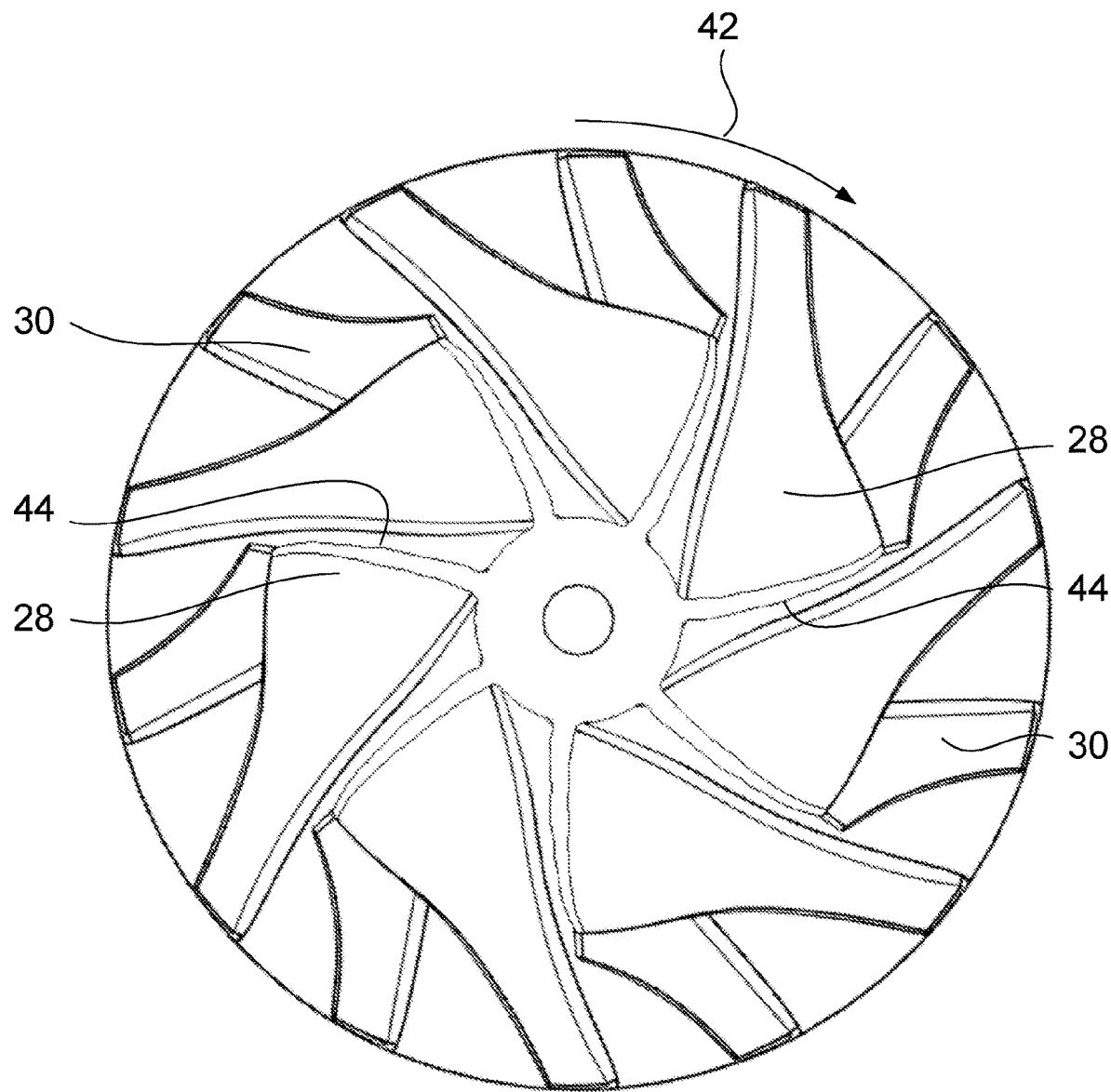
FIG. 5 is a cross-section of the impeller of the present invention taken through the line A-A of FIG. 3.

FIG. 5 shows a cross-section of the impeller 6 taken through the line A-A of FIG. 3. With reference to FIG. 3, the line A-A extends normal to the impeller axis 32 and is positioned just slightly downstream of the main-blade leading edges 48 in the inducer portion 36 of the impeller 6. With reference to FIG. 5, it can be seen that the main-blade pressure surfaces 44 define a profile in a plane normal to the impeller axis 32 that is generally back-swept. By providing the portion of the main-blade pressure surfaces 44 closest to the main-blade leading edges 48 with a back-swept profile, this helps to better distribute internal stresses close to the main-blade leading edges 48.

Figure 6:
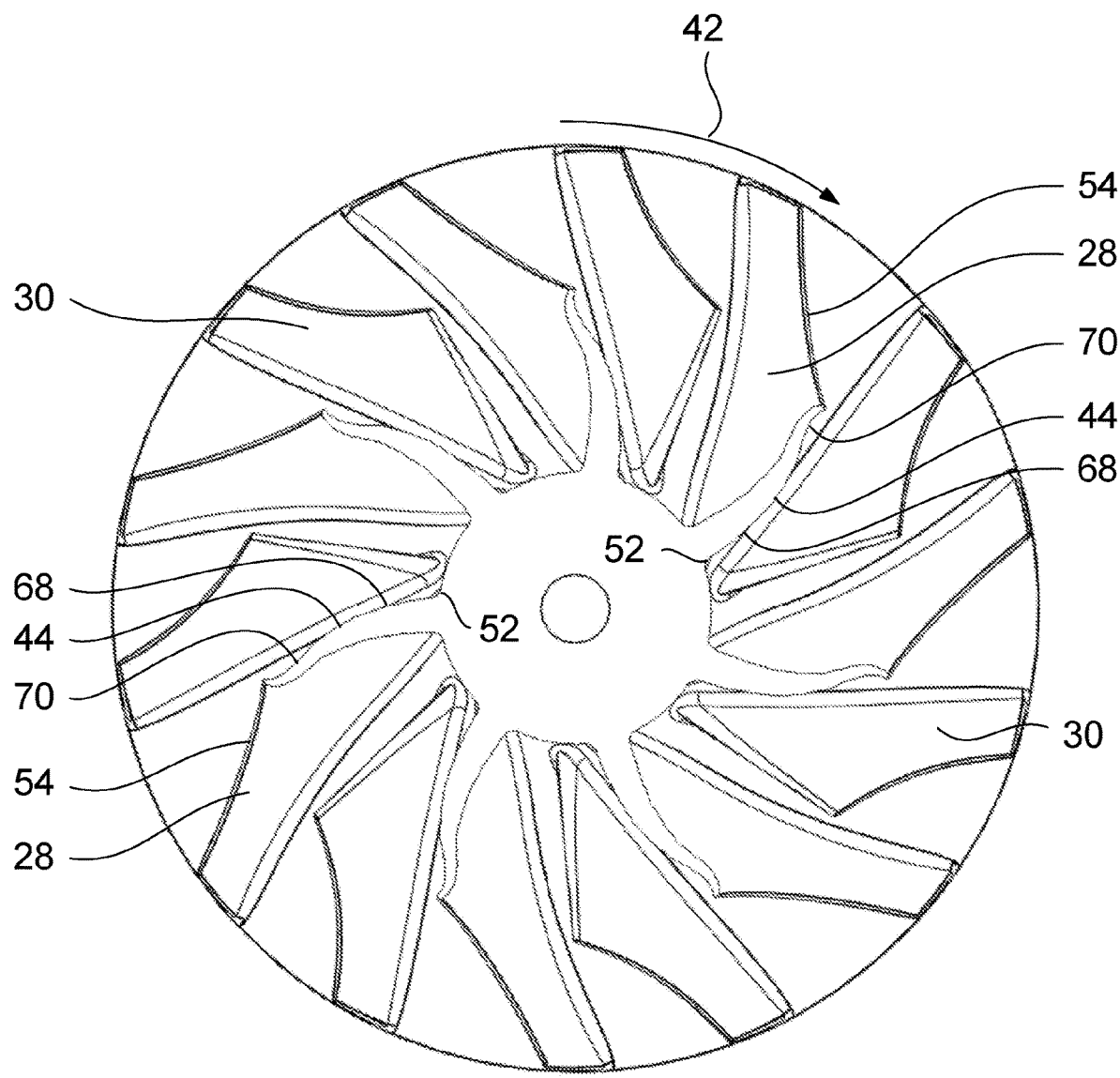
FIG. 6 is a cross-section of the impeller of the present invention taken through the line B-B of FIG. 3.

FIG. 6 shows a cross-section of the impeller 6 taken through the line B-B of FIG. 3. With reference to FIG. 3, the line B-B extends normal to the impeller axis 32 and is positioned just slightly upstream of the splitter-blade leading edges 60, and is approximately half the distance along the impeller axis 32 from the main-blade leading edges 48 to the main-blade trailing edges 50 at the main-blade blade-roots 52. Accordingly, the line B-B is positioned approximately half way along the axial length of the impeller 6. With reference to FIG. 6, it can be seen that the main-blade pressure surfaces 44 define a profile in a plane normal to the impeller axis 32 that has curvature in two different directions. In particular, the main-blade pressure surfaces 44 comprise a first region 68, close to the main-blade blade-roots 52, that is generally back-swept in the conventional manner, and further comprise a second region 70, close to the main-blade blade-tips 54, that is curved in the same direction as the direction of rotation 42 of the impeller 6. The second region 70 is generally concave, and may therefore alternatively be referred to as a concave portion of the main-blade pressure surfaces 44.

As shown in FIG. 2 and as would be well-understood by the skilled person, pressure surfaces of impellers 6 for compressors 2 have a complex spiral-like geometry that sweeps both circumferentially and radially. However, the geometry of the pressure surfaces themselves in known impellers are not concave. In the context of the present invention, it will be understood that a concave portion is a localised part of a pressure surface that is to some extent "bowl-shaped", "depressed" or "sunken" relative to the remainder of the pressure surface. Consequently, the concave portion will be observable in a cross-section taken along a span-wise contour 78, 82 of the blades 28, 30 between the blade-roots 52, 64 and blade-tips 54, 66 (i.e. a cross-section defined by an imaginary surface containing a span-wise contour 78, 82 of the blade 28, 30 as described below in relation to FIGS. 10 and 11). From a functional perspective, a concave portion of a pressure surface 44, 56 of a blade 28, 30 will be a portion of the pressure surface 44, 56 that is able to direct the momentum of the intake air in a forwards direction with respect to the direction of rotation 42 of the impeller 6.

It will be appreciated that the concave portion of a pressure surface is taken only to relate to the geometry of the pressure surface itself, and not to the geometry of the pressure surface in combination with any other surfaces of the impeller, such as for example the outer surface 34 of the hub 26 or the fillets defining the blade-roots 52, 64. Finally, a concave portion may be observable within a particular plane of intersection of the pressure surface, for example a plane normal to the impeller axis 32, or within a plane within which the impeller axis 32 lies (i.e. a plane parallel to and intersecting the impeller axis 32). However, it should be noted that all radial compressor impeller blades, including conventional ones, define a generally spiral-like swept geometry and that consequently it may be possible to take a cross-section of a conventional blade pressure surface that appears to be concave. However, it will be appreciated that for the purposes of the present invention the term concave is not intended to encompass apparent concave geometry taken through merely any arbitrary cross-section of the blade, and is intended to encompass only geometries that are to some extent "bowl-shaped", "depressed" or "sunken" relative to the remainder of the pressure surface, and which are able to direct the momentum of the intake air in a forwards direction with respect to the direction of rotation 42 of the impeller 6.

Figure 7:
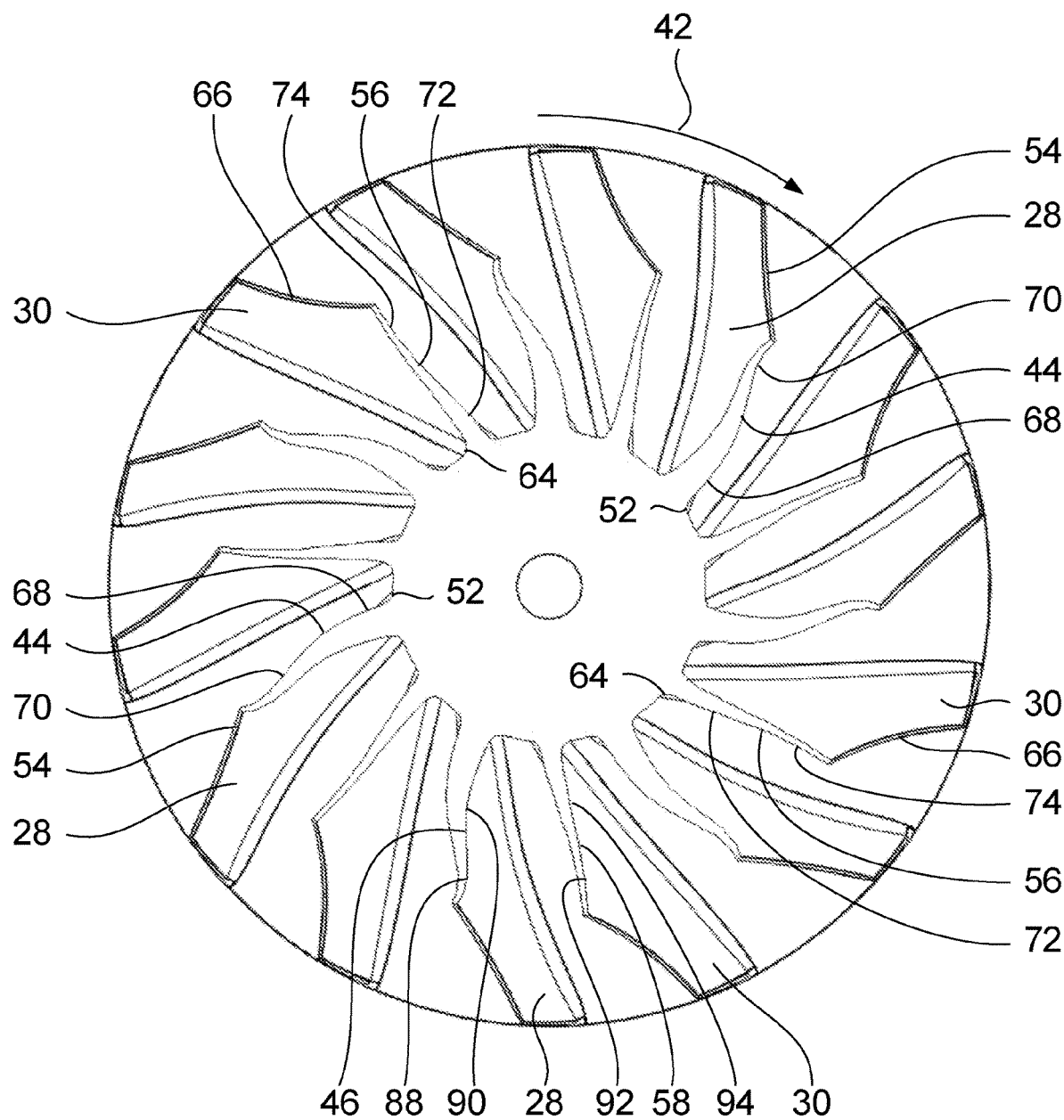
FIG. 7 is a cross-section of the impeller of the present invention taken through the line C-C of FIG. 3.

FIG. 7 shows a cross-section of the impeller 6 taken through the line C-C of FIG. 3. With reference to FIG. 3, the line C-C extends normal to the impeller axis 32 and is positioned just slightly downstream of the splitter-blade leading edges 60. With reference to FIG. 7, it can be seen that the main-blade pressure surfaces 44 define generally the same profile as in FIG. 6 described above. It can further be seen that the splitter-blade pressure surfaces 56 define a profile in a plane normal to the impeller axis 32 that has curvature in two different directions. In particular, the splitter-blade pressure surfaces 56 comprise a first region 72, close to the splitter-blade blade-roots 64, that are generally straight in a conventional manner, and further comprise a second region 74, close to the splitter-blade blade-tips 66, that is curved in the same direction as the direction of rotation 42 of the impeller 6. The second region 74 is generally concave, and may therefore alternatively be referred to as a concave portion of the splitter-blade pressure surfaces 56.

Figure 8:
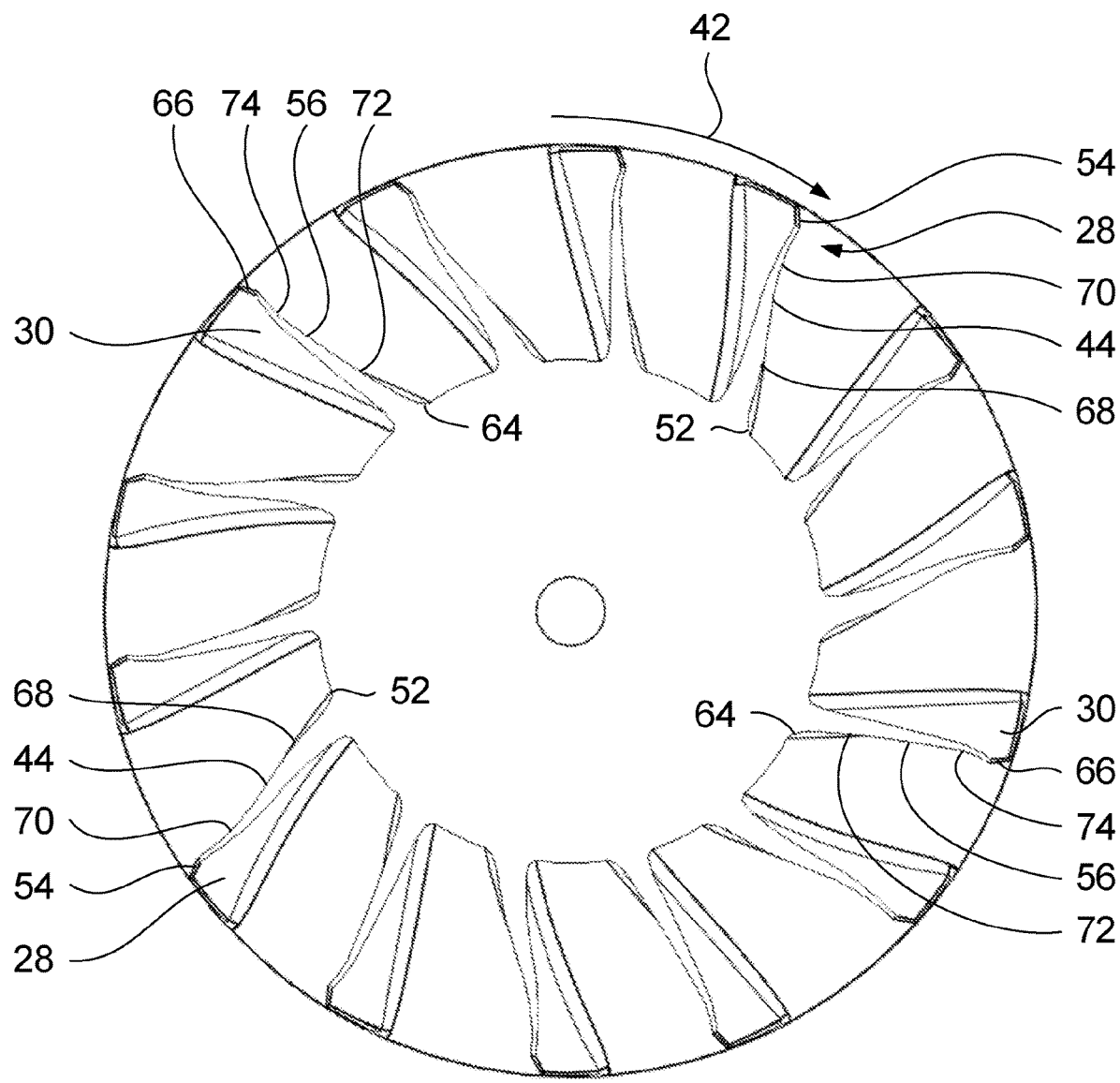
FIG. 8 is a cross-section of the impeller of the present invention taken through the line D-D of FIG. 3.

FIG. 8 shows a cross-section of the impeller 6 taken through the line D-D of FIG. 3. With reference to FIG. 3, the line D-D extends normal to the impeller axis 32 and is positioned just slightly upstream of the main-blade and splitter-blade trailing edges 50, 62. With reference to FIG. 8, it can be seen that the main-blade pressure surfaces 44 define generally the same profile as in FIGS. 6 and 7 described above. It can further be seen that the splitter-blade pressure surfaces 56 define generally the same profile as in FIG. 7 as described above, although the degree of curvature of the concave portion 74 of the splitter-blades 30 has increased slightly compared to the profile shown in FIG. 7.

Figure 9:
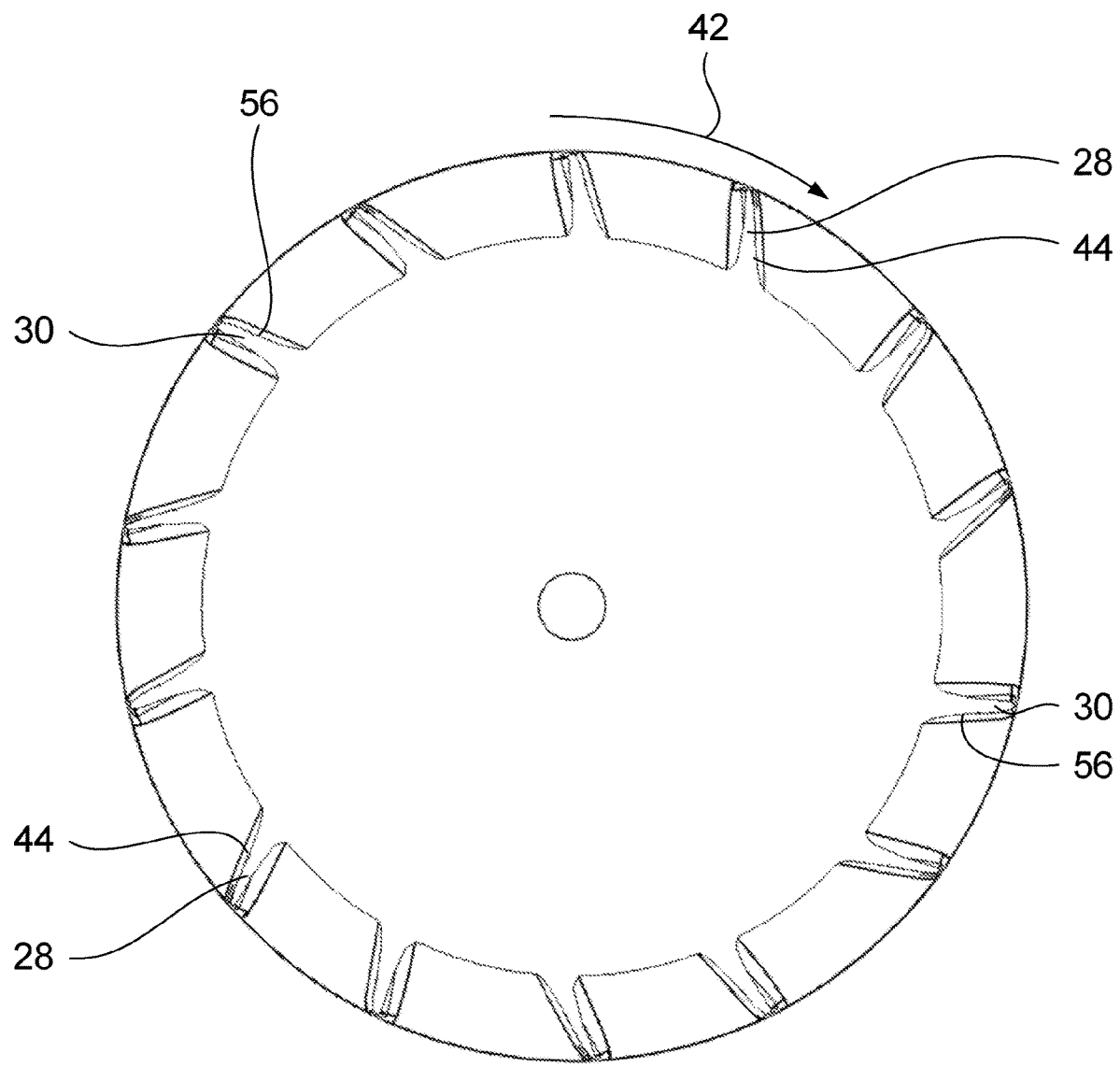
FIG. 9 is a cross-section of the impeller of the present invention taken through the line E-E of FIG. 3.

FIG. 9 shows a cross-section of the impeller 6 taken through the line E-E of FIG. 3. With reference to FIG. 3, the line E-E extends normal to the impeller axis 32 and is positioned just slightly forward of the back of the impeller 6 in the exducer portion 38. With reference to FIG. 9, it can be seen that the main-blade pressure surfaces 44 and the splitter-blade pressure surfaces 58 define generally straight profiles or slightly back-swept profiles in a conventional manner. As such, the exducer portion 38 of the impeller 6 functions in an effectively conventional way, such that it increases the operating range of the impeller 6.

Figure 14:
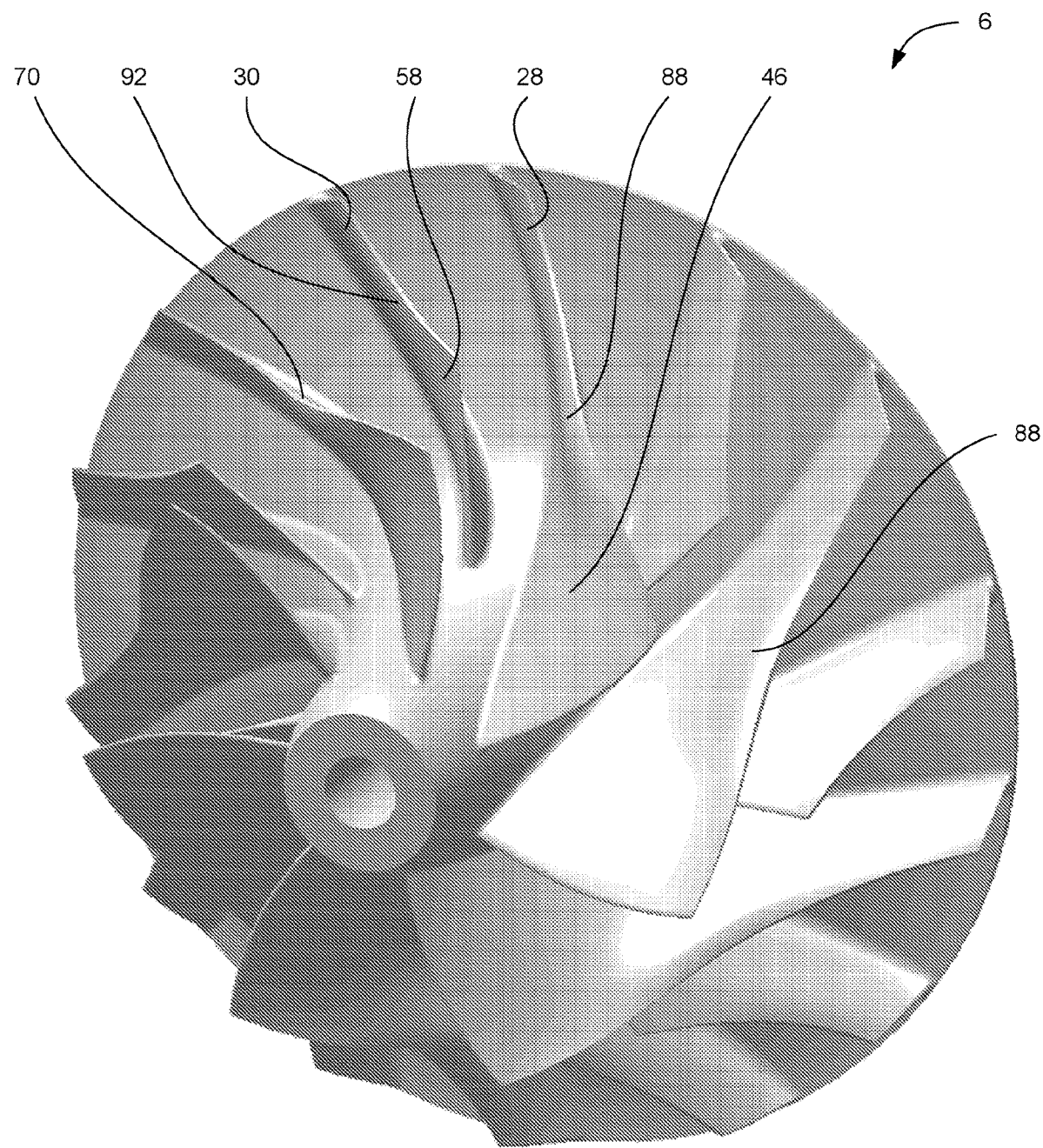
FIG. 14 is a grayscale-shaded perspective view of the impeller.

FIG. 14 shows a grayscale-shaded perspective view of the impeller 6. The blades 28, 58 are slightly wider at the blade-roots 52, 64 than the blade-tips 54, 66, however in general terms the thickness of the blades 28, 58 tapers from the blade-roots 52, 64 to the blade-tips 54, 66 at a constant rate. As such, the suction surfaces 46, 58 and pressure surfaces 44, 56 are generally conformal in shape. From the grayscale shading in FIG. 14, it is possible to discern the convex portions 88 of the main-blade suction surfaces 46 and the convex portions 92 of the splitter-blade suction surfaces 58. The convex portions 88, 92 are indicative of the presence of the corresponding concave portions 70 of the main-blade pressure surface 44 and the concave portion 74 of the splitter-blade pressure surface 56.

FIGS. 15 to 38 show various cross-sectional sections taken in various planes rotated about the axis 32 so as to depict the change in profile of the main blades 28 from the leading edge 48 to the trailing edge 50.

Figure 15:
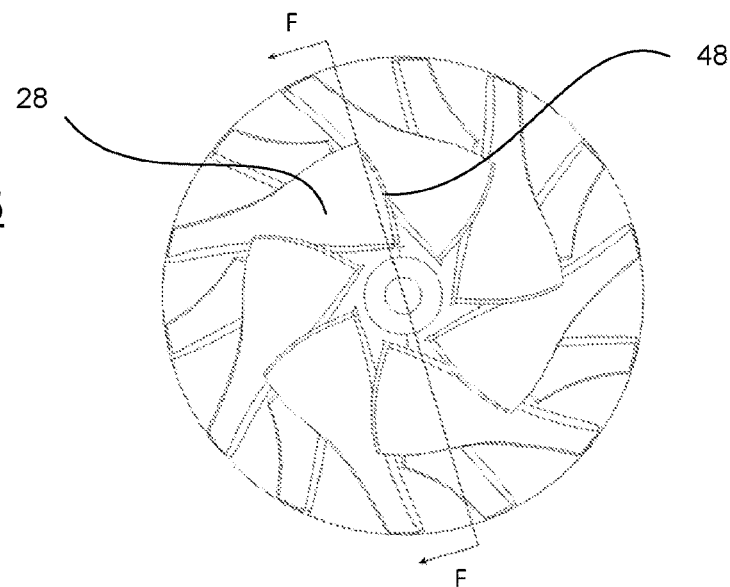
FIG. 15 shows an end view of the impeller.
Figure 16:
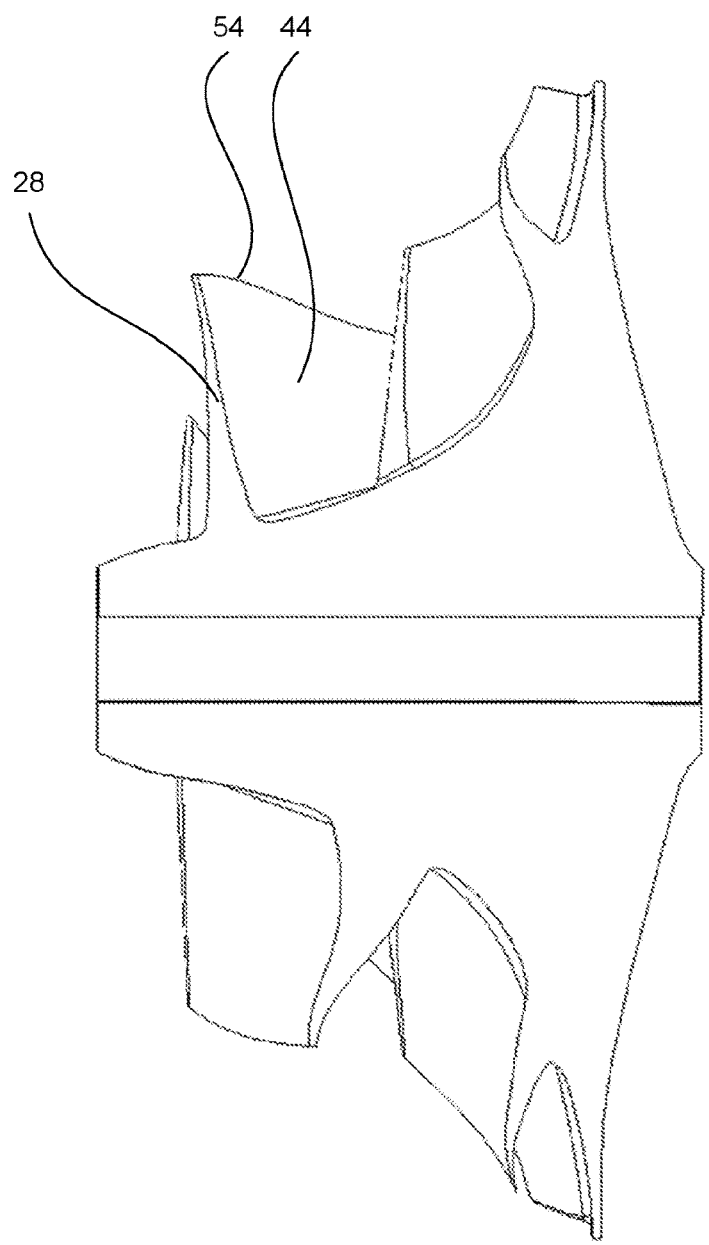
FIG. 16 is a section view taken through the line F-F of FIG. 15.

FIG. 15 shows an end view of the impeller 6 normal to the axis 32 from the inducer side. The section line F-F intersects the axis 32 and the tip of the main-blade leading edge 48 of one of the main blades 28. FIG. 16 shows a cross-section of the impeller 6 taken through the line F-F. As described above, the profiles of the main blades 28 are generally back-swept in the region of the main-blade leading edges 48. Although the profile of the main-blade pressure surface 44 bends in two directions in the section F-F, it will be appreciated that this is a conventional shape that is a result of the spiral-like sweeping of the main-blade pressure surface 44. In particular, within this section of the main-blade pressure surface 44, no part of the main-blade pressure surface 44 is sunken relative to the remainder of the pressure surface 44, and therefore the profile of the main blade 28 in this section is not considered to be concave, FIG. 17 shows an end view of the impeller 6 normal to the axis 32 from the inducer side. The section line G-G is oriented 5° in the anti-clockwise direction about the axis 32 from the section line F-F of FIG. 15. FIG. 18 shows a cross-section of the impeller 6 taken through the line G-G. It can be seen that the profile of the main blade 28 in section G-G is generally the same as that in F-F.

FIG. 19 shows an end view of the impeller 6 normal to the axis 32 from the inducer side. The section line H-H is oriented 10° in the anti-clockwise direction about the axis 32 from the section line F-F of FIG. 15. FIG. 20 shows a cross-section of the impeller 6 taken through the line H-H. Again, the profile of the main blade 28 in H-H is generally similar to the profiles in F-F and G-G.

Figure 21:
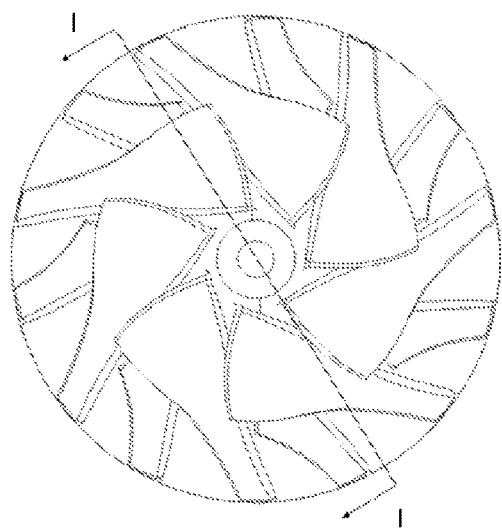
FIG. 21 shows an end view of the impeller.
Figure 22:
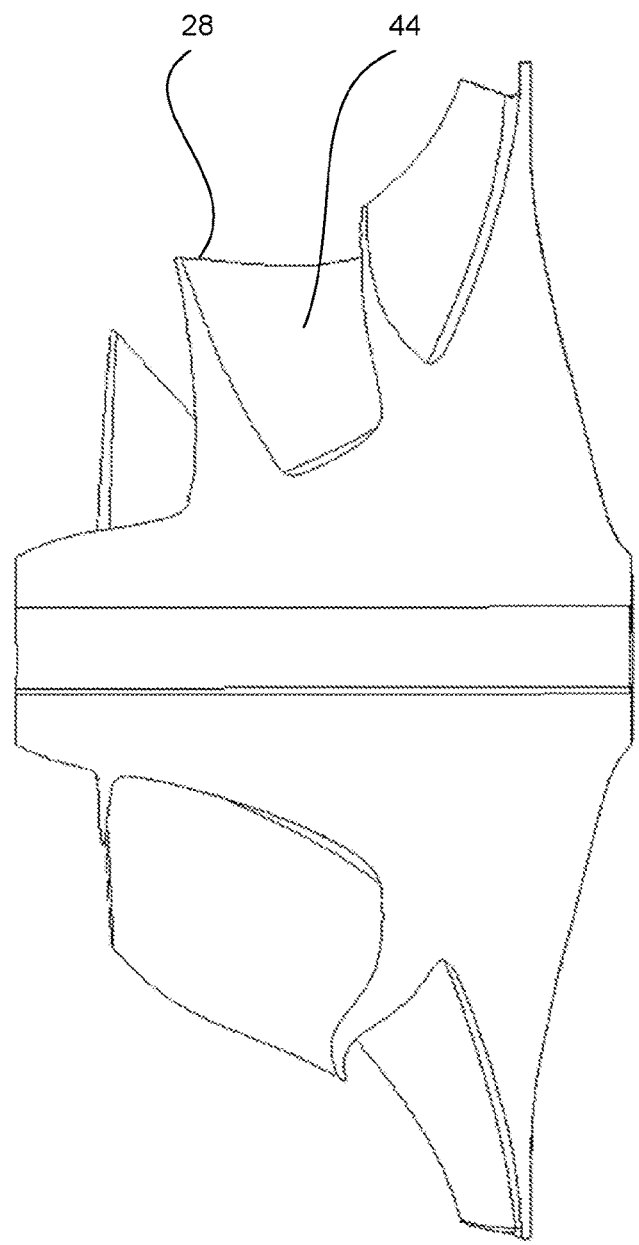
FIG. 22 is a section view taken through the line I-I of FIG. 21.

FIG. 21 shows an end view of the impeller 6 normal to the axis 32 from the inducer side. The section line I-I is oriented 15° in the anti-clockwise direction about the axis 32 from the section line F-F of FIG. 15. FIG. 22 shows a cross-section of the impeller 6 taken through the line I-I. It can be seen from FIG. 22 that at this region of the main blade 28 the profile begins to straighten. Although the concave portion 70 of the main blade 28 is not yet formed in the section I-I, the profile of the main-blade pressure surface 44 has diverged from the conventional shapes depicted in sections F-F to H-H. This indicates the beginning of the formation of the concave portion 70.

Figure 23:
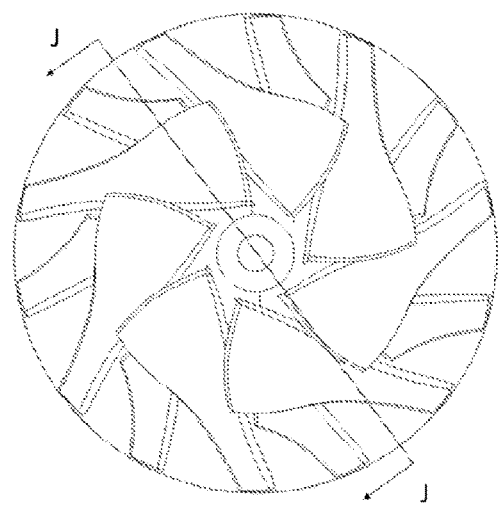
FIG. 23 shows an end view of the impeller.
Figure 24:
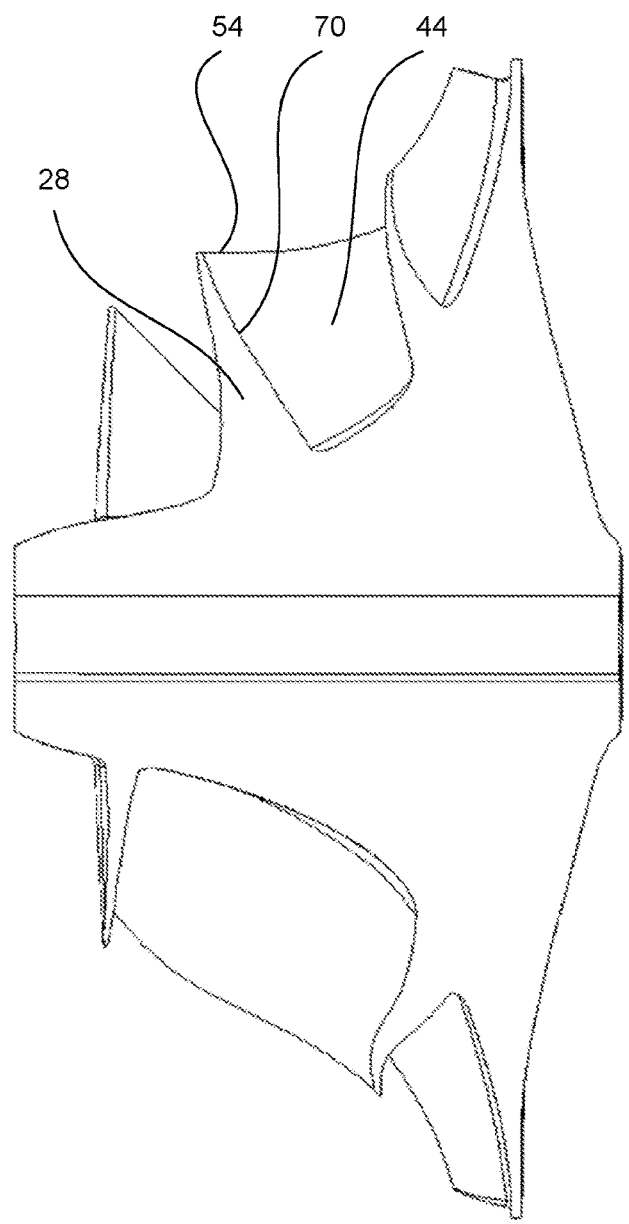
FIG. 24 is a section view taken through the line J-J of FIG. 23.

FIG. 23 shows an end view of the impeller 6 normal to the axis 32 from the inducer side. The section line J-J is oriented 20° in the anti-clockwise direction about the axis 32 from the section line F-F of FIG. 15. FIG. 24 shows a cross-section of the impeller 6 taken through the line J-J. It can be seen from FIG. 24 that at this region of the main blade 28 the concave portion 70 is now visible. In particular, it is clear that the conventional shape in profile F-F has been inverted. In particular, whilst the conventional profile in F-F sweeps away from the exducer portion 38 at the main-blade blade tip 54 (i.e. from right to left in FIG. 16), in section J-J the profile of the main-blade pressure surface 44 sweeps towards the exducer portion 38 the main-blade blade tip 54 (i.e. from left to right in FIG. 24). Accordingly, it can clearly be seen that a "sunken" portion of the main-blade pressure surface 44 is formed. The profile of the pressure surface 44 may be said to be generally "s-shaped" in this section, and in particular may be said to be an "s-shaped" profile that is inverted in respect to a conventional blade profile.

Figure 25:
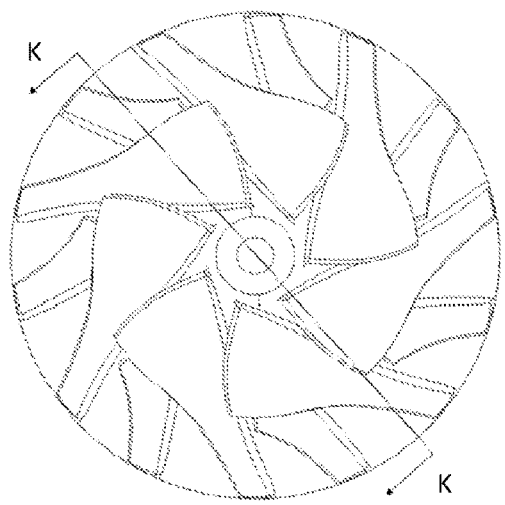
FIG. 25 shows an end view of the impeller.
Figure 26:
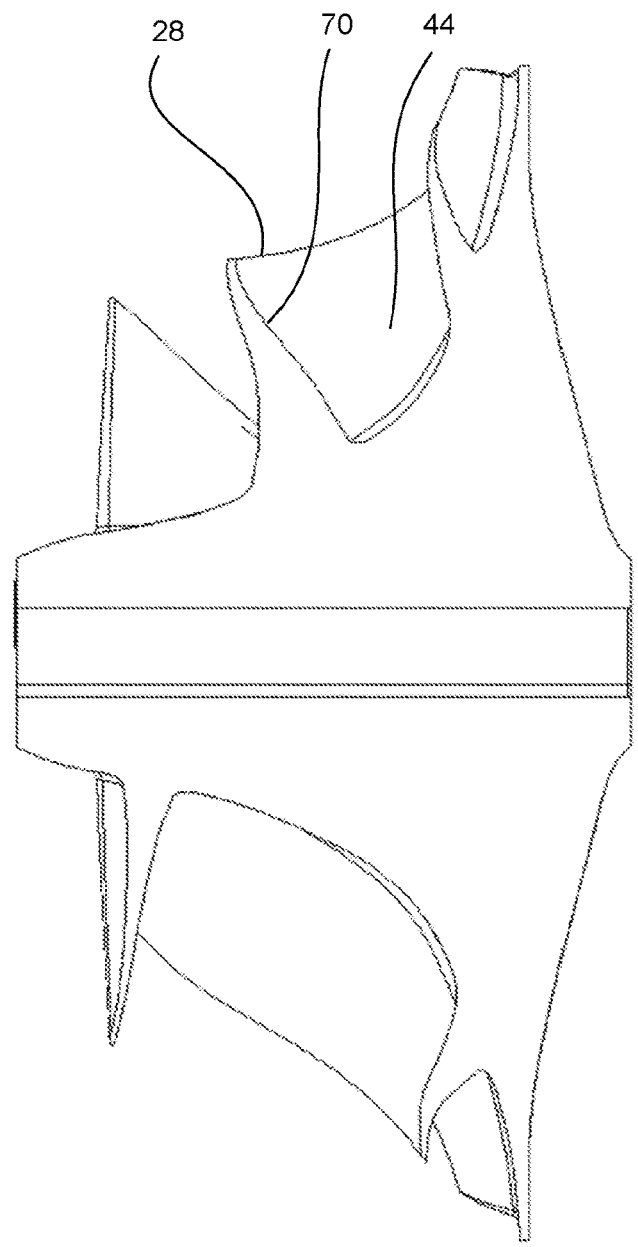
FIG. 26 is a section view taken through the line K-K of FIG. 25.

FIG. 25 shows an end view of the impeller 6 normal to the axis 32 from the inducer side. The section line K-K is oriented 25° in the anti-clockwise direction about the axis 32 from the section line F-F of FIG. 15. FIG. 26 shows a cross-section of the impeller 6 taken through the line K-K. It can be seen from FIG. 26 that as the section line moves towards the centre of the main blade 28, the "sunken" portion of the pressure surface 44 (i.e. the concave portion 70) becomes increasingly pronounced and distinctly concave.

FIG. 27 shows an end view of the impeller 6 normal to the axis 32 from the inducer side. The section line L-L is oriented 30° in the anti-clockwise direction about the axis 32 from the section line F-F of FIG. 15. FIG. 28 shows a cross-section of the impeller 6 taken through the line L-L. It can be seen from FIG. 28 that because the section line L-L passes through a central portion of the main blade 28, the concave portion 70 of the main-blade suction surface 44 is highly pronounced.

Figure 29:
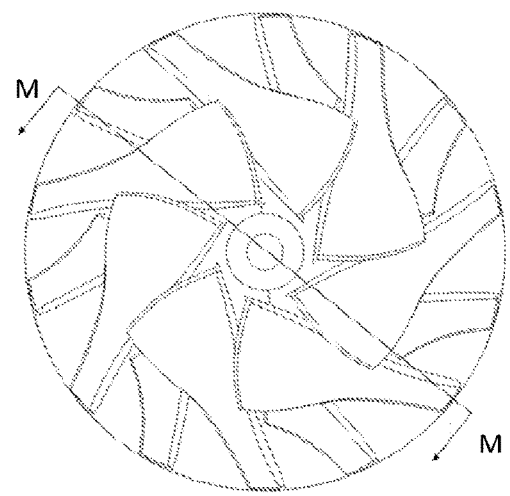
FIG. 29 shows an end view of the impeller.
Figure 30:
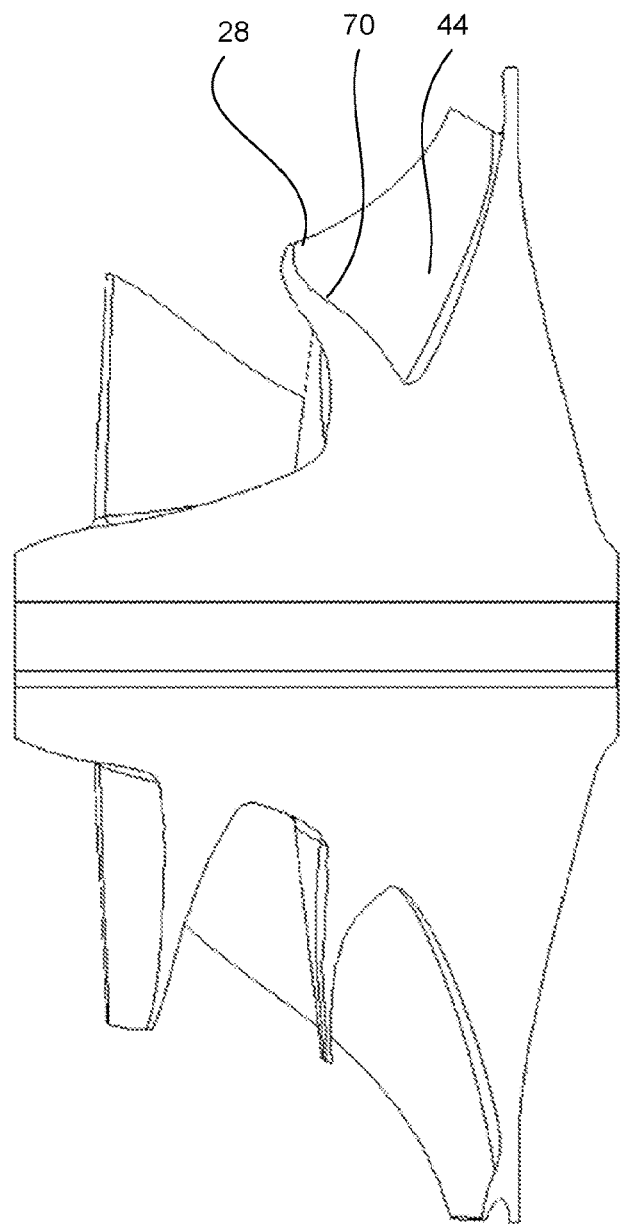
FIG. 30 is a section view taken through the line M-M of FIG. 29.

FIG. 29 shows an end view of the impeller 6 normal to the axis 32 from the inducer side. The section line M-M is oriented 35° in the anti-clockwise direction about the axis 32 from the section line F-F of FIG. 15. FIG. 30 shows a cross-section of the impeller 6 taken through the line M-M. The line M-M passes through nearly the centre of the main blade 28, and therefore it can be seen from FIG. 30 that the concave portion 70 of the main-blade suction surface 44 is highly pronounced, and that the main blade 28 continues to define a generally "s-shaped" cross-section in this region.

FIG. 31 shows an end view of the impeller 6 normal to the axis 32 from the inducer side. The section line N-N is oriented 40° in the anti-clockwise direction about the axis 32 from the section line F-F of FIG. 15. FIG. 32 shows a cross-section of the impeller 6 taken through the line N-N. It can be seen from FIG. 32 that the concave portion 70 of the main-blade suction surface 44 is highly pronounced, and that the main blade 28 continues to define a generally "s-shaped" cross-section in the section N-N.

FIG. 33 shows an end view of the impeller 6 normal to the axis 32 from the inducer side. The section line O-O is oriented 45° in the anti-clockwise direction about the axis 32 from the section line F-F of FIG. 15. FIG. 34 shows a cross-section of the impeller 6 taken through the line O-O. It can be seen from FIG. 34 that the concave portion 70 of the main-blade suction surface 44 is becoming less pronounced as the section moves away from the centre of the main blade 28. However, the main blade 28 continues to define a generally "s-shaped" cross-section in the section O-O.

Figure 35:
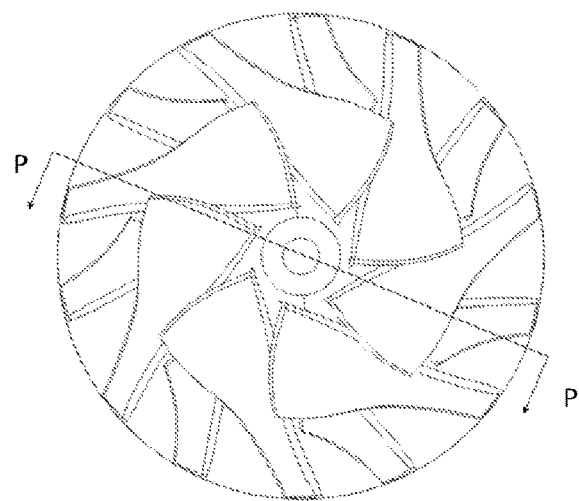
FIG. 35 shows an end view of the impeller.
Figure 36:
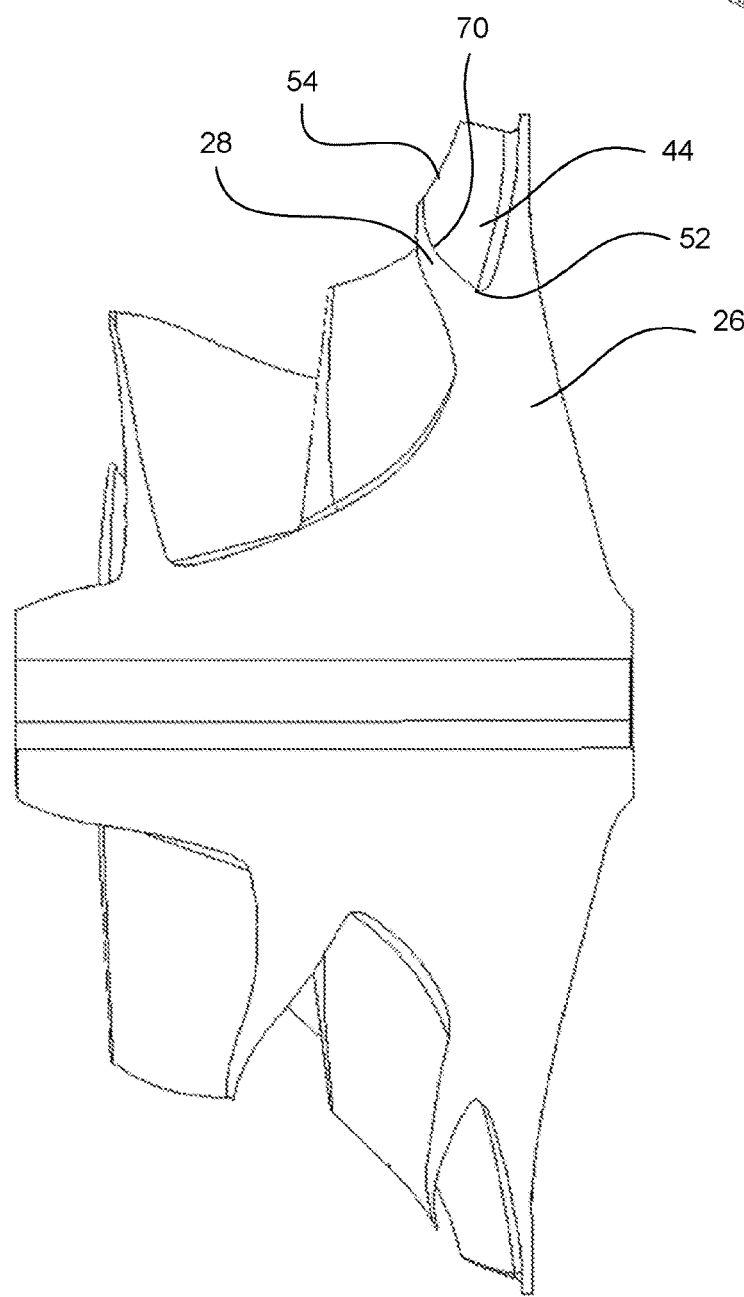
FIG. 36 is a section view taken through the line P-P of FIG. 35.

FIG. 35 shows an end view of the impeller 6 normal to the axis 32 from the inducer side. The section line P-P is oriented 50° in the anti-clockwise direction about the axis 32 from the section line F-F of FIG. 15. FIG. 36 shows a cross-section of the impeller 6 taken through the line P-P. It can be seen from FIG. 36 that the concave portion 70 of the main-blade suction surface 44 is much less pronounced than at the centre of the main blade 28. Moreover, because the section P-P is closer to the exducer portion 38 the radial extent of the main blade 28 from the hub 26 is reduced compared to the earlier sections. Accordingly, the "s-shaped" profile is lost at the main-blade blade-root 52. However, profile of the pressure surface 44 at the blade tip 54 continues to sweep in the opposite direction to a conventional blade profile, and in particular towards the exducer portion 38 (i.e. from left to right in FIG. 36).

Figure 37:
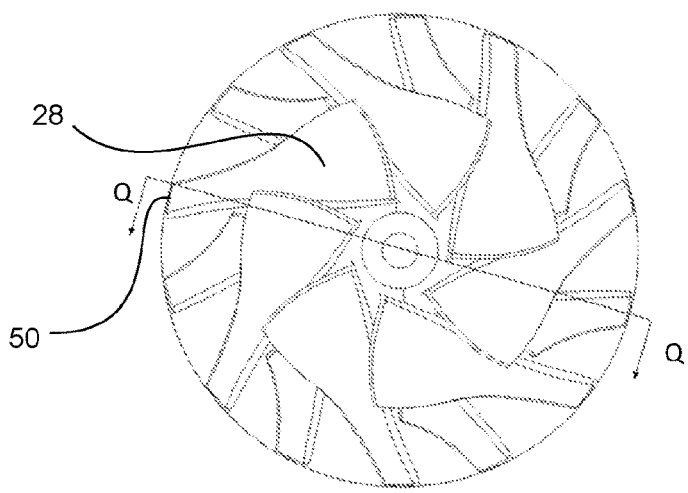
FIG. 37 shows an end view of the impeller.
Figure 38:
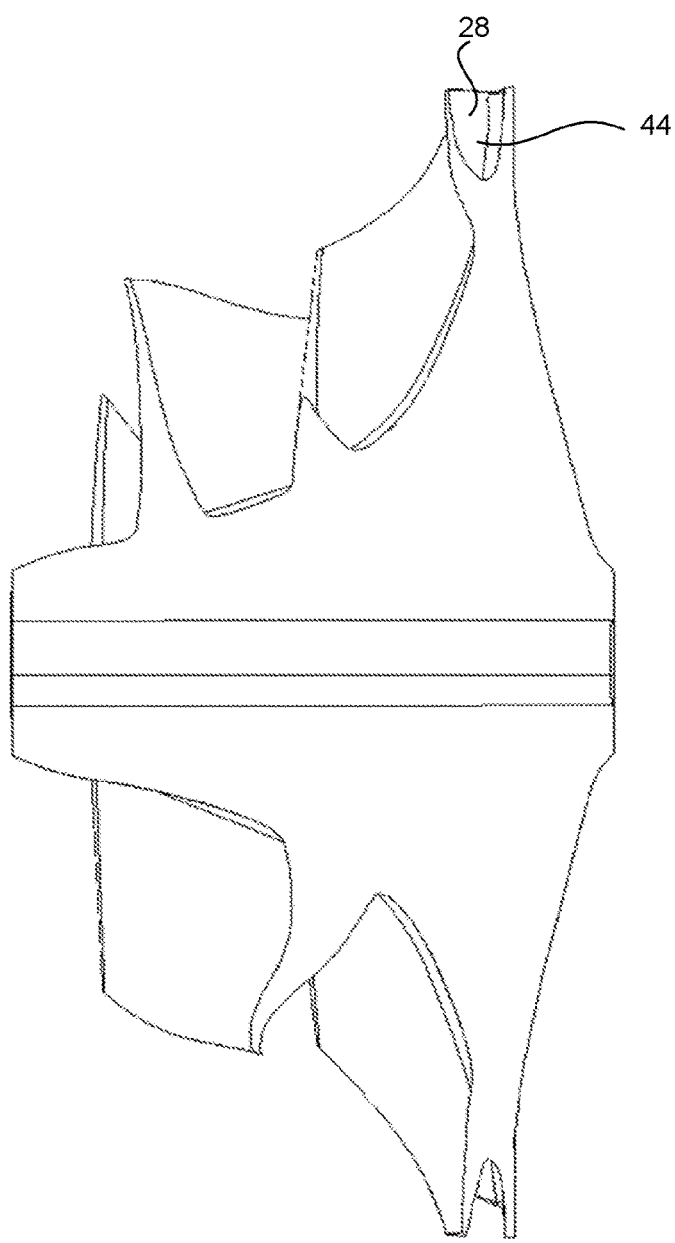
FIG. 38 is a section view taken through the line Q-Q of FIG. 37.

FIG. 37 shows an end view of the impeller 6 normal to the axis 32 from the inducer side. The section line Q-Q is oriented 57° in the anti-clockwise direction about the axis 32 from the section line F-F of FIG. 15, which corresponds to a position at which the section line Q-Q intersects the axis 32 and the tip of the trailing edge 50 of the main blade 28. FIG. 38 shows a cross-section of the impeller 6 taken through the line Q-Q. It can be seen from FIG. 38 that the profile of the main-blade suction surface 44 sweeps in a direction that is generally parallel to the direction of flow out of the exducer portion 38 (i.e. radially relative to the axis 32). Accordingly, it is apparent that the pressure surface 44 is conventional in shape. In particular, the pressure surface 44 does not comprise any "sunken" portions or the like, and is therefore not considered to define a concave portion. The profile of the pressure surface 44 in this section is merely a result of the spiral-like swept geometry the main blade 28 that is conventional in design.

During use, as the impeller 6 rotates in the direction of rotation 42 about the impeller axis 32, the main-blade 28 and splitter-blade 30 pressure surfaces 44, 56 impart rotational energy onto the intake air which acts to compress the intake air and throw the intake air radially outwards with respect to the impeller axis under centrifugal force. Some of the intake air will reach the shroud portion 17 of the compressor housing 7 close to the main-blade 28 and splitter-blade 30 blade-tips 54, 64. The shroud portion 17 will exert a frictional force on the intake air in this region that acts in an opposite direction to the direction of rotation 42, and as such urges the air close to the shroud 17 over the blade-tips 54, 64. In addition, the localised areas of low pressure caused by the main-blade 28 and splitter-blade 30 suction surfaces 46, 58 creates a pressure differential between the pressure surfaces 44, 56 and the suctions surfaces 46, 58 of each blade 28, 30 that further acts to draw intake air over the blade-tips 54, 64.

However, the concave portions 70, 74 of the main-blades 28 and the splitter-blades 30 act to direct the momentum of the intake air passing over the concave portions 70, 74 in a forwards direction with respect to the direction of rotation 42 of the impeller 6. Therefore, the intake air in the immediate vicinity of the blade-tips 54, 56 exhibits increased momentum in the direction of rotation 42 (compared, for example, to a conventional blade 28, 30 profile which is entirely back-swept or straight). Accordingly, the intake air leaving the blade tips 54, 56 having passed over the concave portions 70, 74 is better able to react against the friction applied by the shroud portion 17 and the differential pressure over the blades 28, 30. Additionally, because the concave portions 70, 74 act to change the direction of momentum of the intake air that flows over them, the concave portions 70, 74 accelerate the flow passing over them and create localised regions of reduced pressure. This reduces the pressure imbalance between the pressure surfaces 44, 56 and the suction surfaces 46, 58 and therefore reduces the magnitude of the pressure effects which drive over-tip leakage. As such, the amount of intake air that spills over the blade-tips 54, 64 is reduced. Because over-tip leakage is reduced, a greater proportion of the intake air is acted upon by the blades 28, 30 and therefore the efficiency of the impeller 6 is increased.

Although the concave portions 70, 74 act to deflect the intake air in the opposite direction to the back-swept portions 68 of the main-blades 28, the presence of the back-swept portions 68 is still able to offer most of the advantages of a conventionally back-swept blade. It has been found that the presence of the concave portions 70, 74 does not adversely affect the increased operating range of the impeller 6 that is provided by the back-swept portions. Furthermore, because the efficiency of the impeller 6 is increased (by reducing over-tip leakage), the impeller 6 can achieve a higher pressure ratio than a conventionally back-swept impeller. However, the increase in pressure ratio achievable is relatively modest in comparison to the increase in efficiency. For example, a 1% increase in efficiency arrives at around a 1.5% increase in pressure ratio (or an increase in pressure ratio of around 0.05).

It has also been found that the concave profile of the pressure surfaces 44, 56 may provide increase resistance to fatigue and therefore improve the lifetime of the impeller 6. Without intending to be limited by theory, it is believed that the concave portions 70, 74 increase the stiffness of the blades 28, 30. In particular, the inclusion of the concave portions 70, 74 increases the geometrical complexity of the blade profiles, and thereby increases the second moment of area of the blade, providing resistance to deflection by centrifugal forces during use. The second moment of area may be further increased in blades that comprise sections of conventional back-swept geometry in combination with the concave portions 70, 74 described above, and therefore the resistance to fatigue may be more pronounced in such blade designs.

Figure 10:
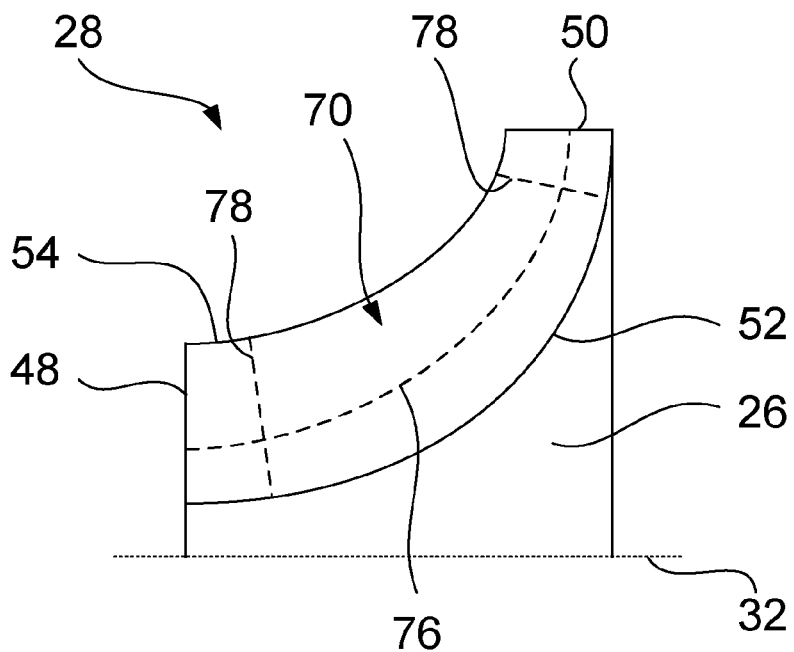
FIG. 10 is a schematic two-dimensional meridional view of a main-blade of the impeller.

As will be apparent from the description above, the concave portions 70, 74 are only present in certain parts of the blades 28, 30. For the main-blades 28, the inducer portions 36 and exducer portions 38 are effectively of a conventional back-swept design free of any concave parts. The concave portions 70 of the main-blades 28 are instead confined to the middle and radially outer regions of the main-blades 28. FIG. 10 shows a schematic two-dimensional meridional view of one of the main-blades 28 to illustrate the position of the concave portion 70. The main-blade 28 can be considered to define main-blade stream-wise contours 76 and main-blade span-wise contours 78.

The main-blade stream-wise contours 76 are contours of the main-blade pressure surface 44 that start from a position on the main-blade leading edge 48 and follow the geometry of the pressure surface 44 along its length to a corresponding position on the main-blade trailing edge 50. The main-blade stream-wise contours 76 define a main-blade stream-wise contour length measured along the main-blade stream-wise contours 76 from the main-blade leading edge 48 to the main-blade trailing edge 50. The concave portions 70 are located between a position around 10% of the main-blade stream-wise contour length from the main-blade leading edge 48 to a position around 90% of the main-blade stream-wise contour length from the main-blade leading edge 48. However, it has been found that for optimum results the concave portions should extend from a position around 20% of the main-blade stream-wise contour length from the main-blade leading edge 48 to a position around 80% of the main-blade stream-wise contour length from the main-blade leading edge 48. If the concave portions 70 are longer than this, the benefits of back-sweeping outside of the concave portions 70 begin to be diluted (i.e. the operating range of the impeller 6 is narrowed). It is possible for the concave portions 70 to extend across a narrower extent of the span-wise contours 76, for example from a position around 30% or 40% of the main-blade stream-wise contour length from the main-blade leading edge 48 to a position around 60% or 70% of the main-blade stream-wise contour length from the main-blade leading edge 48. However, when the length of the concave portions 70 is reduced, the amount of over-tip leakage increases and the efficiency of the impeller is reduced.

The main-blade span-wise contours 78 are contours of the main-blade pressure surface 44 that start from a position on the main-blade blade-root 52 and follow the span of the main-blade pressure surface 44 and end at a corresponding position on the main-blade blade-tip 54. The main-blade span-wise contours 78 will orthogonally intersect the main-blade stream-wise contours 76. The main-blade span-wise contours 78 define a main-blade span-wise contour length. It has been found that the concave portions 70 should be placed as close as possible to the main-blade blade-tips 54 so that the momentum of the intake air is directed as much as possible in the direction of rotation 42 by the concave portions 70. As such, the concave portions 70 extend between the main-blade blade-tip 54 to a position around 40% of the main-blade span-wise contour length from the main-blade blade-root 52. Optimally, the concave portions 70 should extend from the main-blade blade-tip 54 to a position no less than around 50% of the main-blade span-wise contour length from the main-blade blade-root 52. In some embodiments the concave portions 70 may extend from the main-blade blade-tip 54 to a position around 60% of the main-blade span-wise contour length from the main-blade blade-root 52. With reference FIG. 10, the concave portion 70 is therefore bounded by the area delimited by two main-blade span-wise contour lines 78, the main-blade blade-tip 54 and the main-blade stream-wise contour line 76 (where the main-blade span-wise contour lines 78 and the main-blade stream-wise contour line 76 are positioned at the distances described above relative to the main-blade leading edge 48 and the main-blade blade-root 52).

Figure 11:
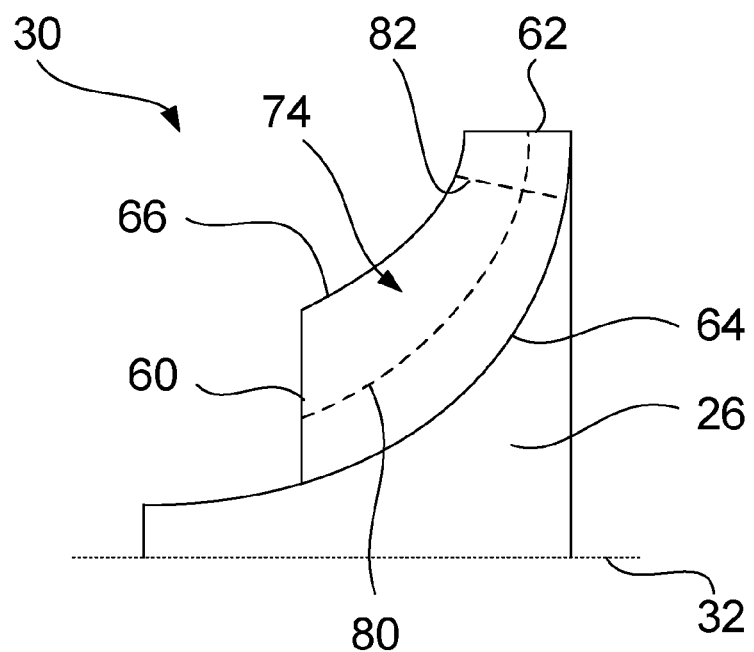
FIG. 11 is a schematic two-dimensional meridional view of a splitter-blade of the impeller.

In contrast to the main-blades 28, for the splitter-blades 30, the concave portions 74 extend up to the splitter-blade leading edges 60. During use, over-tip leakage from a preceding main-blade 28 will collide with the splitter-blade pressure surfaces 56. The intake air in the vicinity of the splitter-blade leading edges 60 is therefore relatively turbulent (i.e. it is not smooth). As such, it has been found that it is beneficial to extend the concave portions 74 of the splitter-blades 30 as far as possible up to the splitter-blade leading edges 60. FIG. 11 shows a schematic two-dimensional meridional view of a splitter-blade 30. The splitter-blade 30 may be considered to define a splitter-blade stream-wise contour 80 and a splitter-blade span-wise contour 82 having corresponding definitions to those of the main-blade 30 and respectively defining a splitter-blade stream-wise contour length and a splitter-blade span-wise contour length.

Optimally, the concave portion 74 extends from the splitter-blade leading edge 60 to a position along the splitter-blade stream-wise contour 80 around 80% of the splitter-blade stream-wise contour length from the splitter-blade leading edge 60. Because the concave portion 74 of the splitter-blade 30 starts at the leading edge, it is better able to assist with tip leakage in the middle of the impeller 6. Furthermore, because the concave portion 74 does not extend to the splitter-blade trailing edge 62, this ensures that a sufficient amount of the exducer portion 38 is conventionally back-swept to provide improved operating range. However, in alternative embodiments the concave portion 74 may extend from the splitter-blade leading edge 60 to a position around 60%, around 70% or around 90% of the splitter-blade stream-wise contour length from the splitter-blade leading edge 60. Furthermore, the concave portion 74 may start from a position spaced apart from the splitter-blade leading edge 60 by a distance around 10% to 20% of the splitter-blade stream-wise contour length.

Furthermore, the concave portion 74 is preferably positioned so that it extends from the splitter-blade blade-tip 66 to a position along the splitter-blade span-wise contour 82 around 40% of the splitter-blade span-wise contour length from the splitter-blade blade-root 64. In alternative embodiments, the concave portion 74 may extend from the splitter-blade blade-tip 66 to a position of the splitter-blade span-wise contour around 50% or 60% from the splitter-blade blade-root 64. With reference FIG. 11, the concave portion 74 is therefore bounded by the area delimited by the splitter-blade span-wise contour lines 82, the splitter-blade blade-tip 66 and the splitter-blade stream-wise contour line 80 (where the splitter-blade span-wise contour line 82 and the splitter-blade stream-wise contour line 80 are positioned at the distances described above relative to the splitter-blade leading edge 60 and the splitter-blade blade-root 64).

Figure 12:
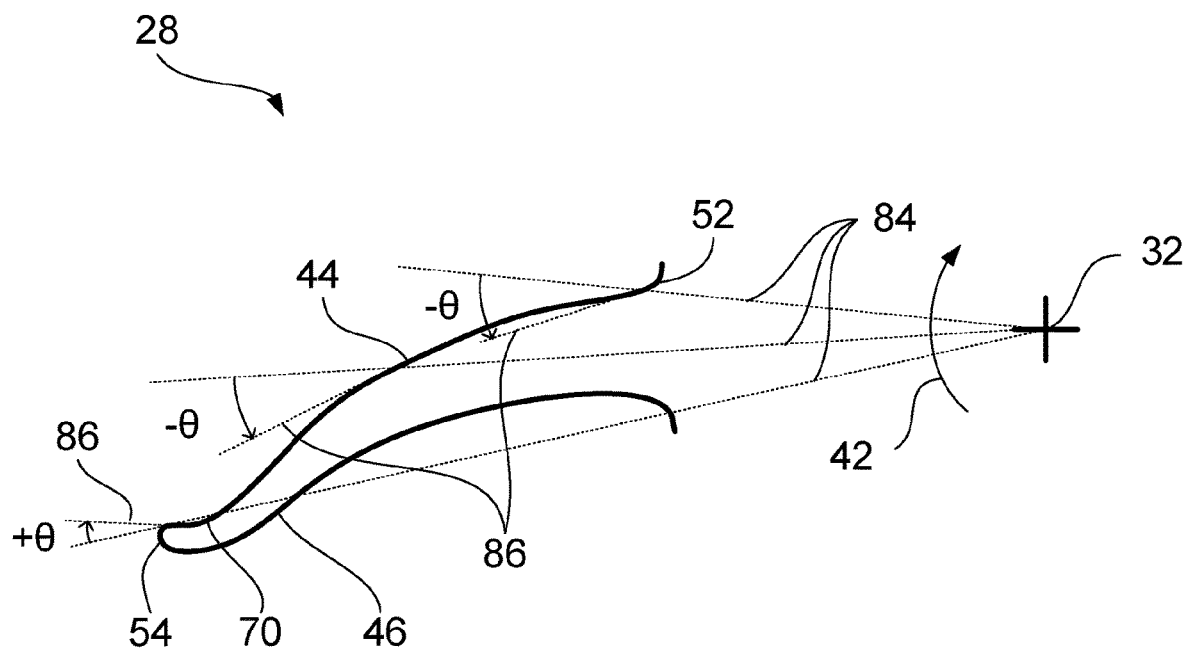
FIG. 12 is a schematic cross-sectional view of a single main-blade taken through the line B-B of FIG. 3 annotated to show the variation of a lean angle θ of a pressure surface of the main-blade.

FIG. 12 shows a schematic cross-sectional view of a single main-blade 28 taken through the line B-B of FIG. 3 (i.e. the same cross-section that is also shown in FIG. 6). Each point on the main-blade pressure surface 44 defines a lean angle θ defined between a radial direction 84 relative to the impeller axis 32 and a tangent 86 of the point on the main-blade pressure surface 44. The lean angle θ is considered to be positive in the direction of rotation 42 of the impeller 6 and negative in the direction opposite the direction of rotation 42 of the impeller 6. The lean angle θ has a negative value at the main-blade blade-root 52 and transitions to a positive value at the main-blade blade-tip 54. As explained above, the concave portion 70 of the main-blade 28 is positioned around halfway along the stream-wise contour 76. The line B-B therefore represents the approximate position on the main-blade 28 where the magnitude of the lean angle θ is largest.

In particular, close to the main-blade blade-root 52 the lean angle θ is around −20°. However, in alternative embodiments the lean angle θ could be greater or smaller than this. For example, the steepest lean angle (in the negative direction) may be up to around −50°, around −40°, around −30°, around −20° around −10° or around −5°, or within a range extending between any of these values. The lean angle θ is maintained at around this value (or may vary slightly) with increasing distance until is it approximately halfway along the main-blade pressure surface 44 to the main-blade blade-tip 54 in the cross-sectional plane. Beyond this point, the lean angle 9 begins to decrease. The reduction of the lean angle 9 indicates the start of the formation of the concave portion 70. The lean angle 9 subsequently reaches zero at radial position relative to the impeller axis 32 that is just slightly beyond the bottom of the concave portion 70. Finally, the lean angle 9 becomes positive as it reaches the main-blade blade-tip 54. The lean angle 9 is around +6.5° at the point where the main-blade pressure surface 44 meets the main-blade blade tip 54.

During use when the impeller 6 is spinning at high velocity, centrifugal forces will act on the main-blade 28. Because the concave portion 70 is generally curved relative to the radial direction 84, the centrifugal forces will act on the main-blade blade-tip 54 in a manner that effectively "straightens out" the concave portion 70. This straightening results in increased internal stresses. If the lean angle θ at the main-blade blade-tip 54 is increased, the in-use internal stresses due to centrifugal loading will also increase. Accordingly, it may be necessary to make the main-blade 28 thicker in order to withstand the internal stresses, or to keep the lean angle θ relatively low at the main-blade blade-tip 54. As such, it has been found that a lean angle θ within the ranges of between around +3° to around +10°, between around +5° to around +8°, or between around +6° to around +7° provide a good balance between reduction of over-tip leakage and blade thickness.

Figure 13:
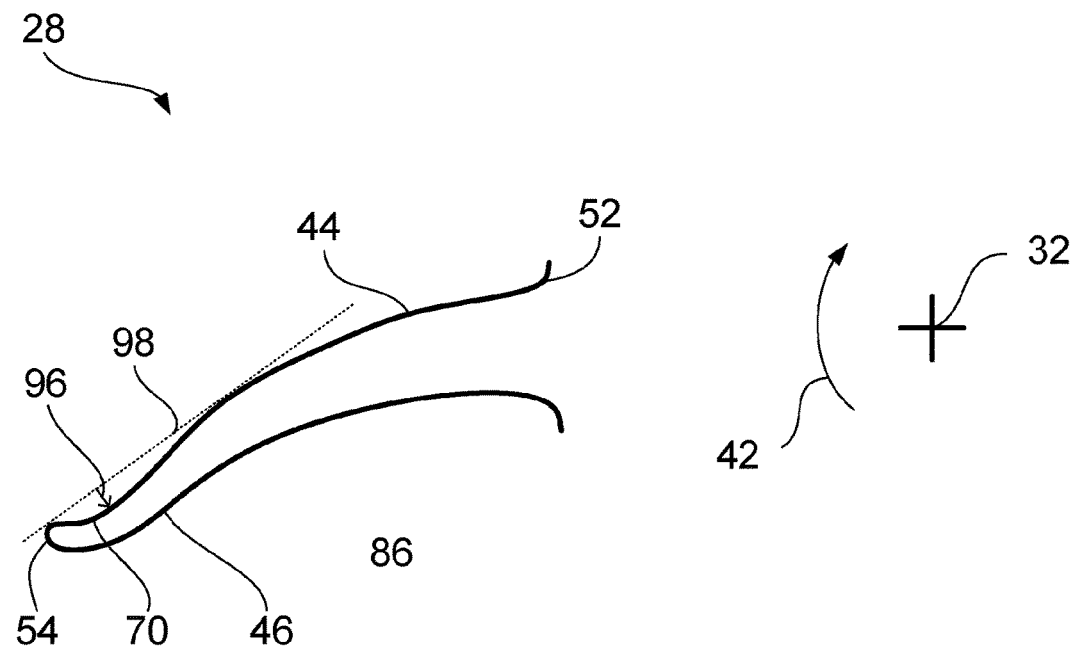
FIG. 13 is a schematic cross-sectional view of a single main-blade taken through the line B-B of FIG. 3 annotated to show the depth of a concavity of a pressure surface of the main-blade.

FIG. 13 shows a schematic cross-sectional view of the main-blade 28 of FIG. 12. With reference to FIG. 13, the concavity 70 defines a depth 96. The depth 96 is measured between a tangent 98 drawn over the main-blade blade-tip 54 and the forward-most point of the centre of the main-blade pressure surface 44 in the direction of rotation 42, and the bottom of the concavity 70 in a direction normal to the tangent 98. If the concavity 70 is too deep the boundary layer formed over the main-blade pressure surface 44 by the intake air may separate from the main-blade pressure surface 44, causing a localised low-pressure recirculation zone within the concavity. Any such recirculation will have a pronounced detrimental impact on the performance of the impeller 6, causing a reduction in achievable pressure ratio and decreased efficiency. Accordingly, the depth 96 of the concavity 70 is preferably small in relation to a length of the profile of the main-blade pressure surface 44 in the plane normal to the impeller axis 32 (i.e. the length of the main-blade pressure surface 44 in the plane of FIG. 13 from the blade-root 52 to the blade-tip 54). In the present embodiment, the depth 96 of the concavity 70 is around 4% of the length of the profile of the main-blade pressure surface 44. Preferably, the depth 96 of the concavity 70 should be no more than around 7% or around 5% of the length of the profile.

The depth 96 of the concavity 70 may be influenced by the lean angle θ at the main-blade blade-tip 54. In general, shallower lean angles θ at the main-blade blade-tip 54 are likely to result in a shallower depth 96 of the concavity 70. However, it will be appreciated that the depth 96 of the concavity 70 will also be determined by the form and shape of the main-blade pressure surface 44. As the skilled person would understand, for best aerodynamics the main-blade pressure surface 44 should be smooth and substantially free of discontinuities, pits, holes or the like. Although the depth 96 of the concavity 70 has been described in relation to the main-blade 28, it will be appreciated that corresponding considerations apply to the splitter-blade 30. In particular, the concave portion 74 of the splitter-blade 30 may have the same depth(s) as the concavity 70 of the main-blade 28 and the lean angles θ of the splitter-blade 30 may be the same as those of the main-blade 28 (particularly at the splitter-blade blade-tips 66).

With reference to FIG. 7, it can be seen that the main-blade and splitter-blade suction surfaces 46, 58 define profiles that are generally conformal to those of the corresponding pressure surfaces 44, 56. Accordingly, the main-blade suction surface 46 defines a convex portion 88 (i.e. forward-swept) on the opposite side of the main-blade 28 to the concave portion 70 of the main-blade pressure surface 44, and further defines a concave portion 90 (i.e. back-swept) on the opposite side of the main-blade 28 to the back-swept portion of the main-blade pressure surface 44. Likewise, the splitter-blade suction surface 58 defines a convex portion 92 on the opposite side of the splitter-blade 30 to the concave portion 74 of the splitter-blade pressure surface 56, and further defines a straight or alternatively concave portion 94 on the opposite side of the splitter-blade 30 to the straight or back-swept portion (i.e. the non-concave portion) of the splitter-blade pressure surface 56. Because the main-blade and splitter-blade suction surfaces 46, 58 are generally conformal to those of the corresponding pressure surfaces 44, 56 the thicknesses of the blades can narrow from the blade-roots to the blade-tips in a conventional manner. This helps to better distribute internal stresses within the blades.

Although the above distribution of lean angles θ has been described in relation to the main-blade 28, it will be appreciated that a corresponding distribution of lean angles θ will apply to the splitter-blades 30. In particular, the lean angles θ of the splitter-blade pressure surfaces 56 will transition from a negative value to a positive value from the splitter-blade blade roots 64 to the splitter-blade blade-tips 66.

Although the impeller 6 described above comprises main-blades 28 and splitter-blades 30, it will be appreciated that in alternative embodiments the impeller 6 may comprise only main-blades 28 (i.e. and no splitter-blades 30). Furthermore, the impeller 6 may comprise substantially any number of main-blades 28 and/or splitter blades 30, the precise number of which may be chosen to suit an intended purpose.

Although the parts lying outside of the concave portions 70, 74 of the main-blade and splitter-blade pressure surfaces 44, 56 have been described as back-swept, it will be appreciated that the parts of the main-blade and splitter-blade pressure surfaces 44, 56 lying outside of the concave portions 70, 74 may have any suitable geometry that is not concave. For example, these parts may be straight, back-swept or a mixture of the two.

Although the impeller 6 described above is described in relation to a compressor 2 of a turbocharger 1, it will be appreciated that the compressor 2 within which the impeller 6 is used may be used for applications that do not relate to internal combustion engines. For example, the impeller 6 and compressor 2 could be used to provide an air intake to a hydrogen fuel cell system, for example in a vehicle.

Although the impeller 6 shown in FIG. 2 is driven during use in the clockwise direction, it will be appreciated that in alternative embodiments the impeller 6 may be configured so that it rotates in an anti-clockwise direction. However, it will be appreciated that it is not possible to simply drive the impeller in the opposite direction (i.e. opposite to the direction of rotation 42), since the shape of the blades 28, 30 are not configured to provide compression when rotated in the opposite direction. As such, if rotation in an anti-clockwise direction is desired the blades 28, 30 must be mirrored compared to the arrangement shown in FIG. 2 so that the blade profiles sweep in the opposite direction. This enables the blades 28, 39 to provide compression when rotated anti-clockwise.

It will be appreciated that the impeller 6 may be manufactured using any suitable manufacturing process. For example, the impeller may be machined from a solid block. Due to the geometrical nature of the concave portions 70, 74, it may be necessary to manufacture the concave portions using manufacturing techniques which permit the formation of under-cuts, such as for example point-milling or the like. The impeller 6 may be machined from a near-net shape forging.

Additionally or alternatively, the impeller 6 may be manufactured by an additive manufacturing process. The impeller 6 may be made by an additive manufacturing process to a near-net shape and then finished in one or more machining operations. A common example of additive manufacturing is 3D printing; however, other methods of additive manufacturing are available. Rapid prototyping or rapid manufacturing are also terms which may be used to describe additive manufacturing processes.

As used herein, "additive manufacturing" refers generally to manufacturing processes wherein successive layers of material(s) are provided on each other to "build-up" layer-by-layer or "additively fabricate", a three-dimensional component. This is compared to some subtractive manufacturing methods (such as milling or drilling), wherein material is successively removed to fabricate the part. The successive layers generally fuse together to form a monolithic component which may have a variety of integral sub-components. In particular, the manufacturing process may allow an example of the disclosure to be integrally formed and include a variety of features not possible when using prior manufacturing methods.

Additive manufacturing methods described herein enable manufacture to any suitable size and shape with various features which may not have been possible using prior manufacturing methods. Additive manufacturing can create complex geometries without the use of any sort of tools, moulds or fixtures, and with little or no waste material. Instead of machining components from solid billets of plastic or metal, much of which is cut away and discarded, the only material used in additive manufacturing is what is required to shape the part.

Suitable additive manufacturing techniques in accordance with the present disclosure include, for example, Fused Deposition Modelling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Electron Beam Additive Manufacturing (EBAM), Laser Net Shape Manufacturing (LNSM), Direct Metal Deposition (DMD), Digital Light Processing (DLP), Continuous Digital Light Processing (CDLP), Direct Selective Laser Melting (DSLM), Selective Laser Melting (SLM), Direct Metal Laser Melting (DMLM), Direct Metal Laser Sintering (DMLS), Material Jetting (MJ), NanoParticle Jetting (NPJ), Drop On Demand (DOD), Binder Jetting (BJ), Multi Jet Fusion (MJF), Laminated Object Manufacturing (LOM) and other known processes.

The additive manufacturing processes described herein may be used for forming components using any suitable material. For example, the material may be plastic, metal, composite, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminium, aluminium alloys, iron, iron alloys, stainless steel, and nickel or cobalt based superalloys (e.g., those available under the name Inconel® available from Special Metals Corporation). These materials are examples of materials suitable for use in additive manufacturing processes which may be suitable for the fabrication of examples described herein.

As noted above, the additive manufacturing process disclosed herein allows a single component to be formed from multiple materials. Thus, the examples described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Additive manufacturing processes typically fabricate components based on three-dimensional (3D) information, for example a three-dimensional computer model (or design file), of the component.

Accordingly, examples described herein not only include impellers 6 as described herein, but also methods of manufacturing such impellers 6 via additive manufacturing and computer software, firmware or hardware for controlling the manufacture of such impellers 6 via additive manufacturing.

The structure of one or more parts of the impeller 6 may be represented digitally in the form of a design file. A design file, or computer aided design (CAD) file, is a configuration file that encodes one or more of the surface or volumetric configuration of the shape of the impeller 6. That is, a design file represents the geometrical arrangement or shape of the impeller 6.

Design files can take any now known or later developed file format. For example, design files may be in the Stereolithography or "Standard Tessellation Language" (.stl) format which was created for stereolithography CAD programs of 3D Systems, or the Additive Manufacturing File (.amf) format, which is an American Society of Mechanical Engineers (ASME) standard that is an extensible markup-language (XML) based format designed to allow any CAD software to describe the shape and composition of any three-dimensional object to be fabricated on any additive manufacturing printer.

Further examples of design file formats include AutoCAD (.dwg) files, Blender (.blend) files, Parasolid (.x_t) files, 3D Manufacturing Format (.3mf) files, Autodesk (3ds) files, Collada (.dae) files and Wavefront (.obj) files, although many other file formats exist. Design files can be produced using modelling (e.g. CAD modelling) software.

Once obtained, a design file may be converted into a set of computer executable instructions that, once executed by a processor, cause the processor to control an additive manufacturing apparatus to produce the impeller 6 according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. As discussed above, the formation may be through deposition, through sintering, or through any other form of additive manufacturing method.

The code or instructions may be translated between different formats, converted into a set of data signals and transmitted, received as a set of data signals and converted to code, stored, etc., as necessary. The instructions may be an input to the additive manufacturing system and may come from a part designer, an intellectual property (IP) provider, a design company, the operator or owner of the additive manufacturing system, or from other sources. An additive manufacturing system may execute the instructions to fabricate the impeller 6 using any of the technologies or methods disclosed herein.

Design files or computer executable instructions may be stored in a (transitory or non-transitory) computer readable storage medium (e.g., memory, storage system, etc.) storing code, or computer readable instructions, representative of the impeller 6 to be produced. As noted, the code or computer readable instructions defining the impeller 6 that can be used to physically generate the object, upon execution of the code or instructions by an additive manufacturing system. For example, the instructions may include a precisely defined 3D model of the impeller 6 and can be generated from any of a large variety of well-known computer aided design (CAD) software systems such as AutoCAD®, TurboCAD®, DesignCAD 3D Max, etc.

Accordingly, by controlling an additive manufacturing apparatus according to the computer executable instructions, the additive manufacturing apparatus can be instructed to print out the impeller 6 in one or parts. These can be printed either in assembled or unassembled form. For instance, different sections of the impeller 6 may be printed separately (as a kit of unassembled parts) and then subsequently assembled. Alternatively, the different parts may be printed in assembled form.

In light of the above, embodiments include methods of manufacture via additive manufacturing. This includes the steps of obtaining a design file representing the impeller 6 and instructing an additive manufacturing apparatus to manufacture the impeller 6 in assembled or unassembled form according to the design file. The additive manufacturing apparatus may include a processor that is configured to automatically convert the design file into computer executable instructions for controlling the manufacture of the impeller 6. In these embodiments, the design file itself can automatically cause the production of the impeller 6 once input into the additive manufacturing device. Accordingly, in this embodiment, the design file itself may be considered computer executable instructions that cause the additive manufacturing apparatus to manufacture the impeller 6. Alternatively, the design file may be converted into instructions by an external computing system, with the resulting computer executable instructions being provided to the additive manufacturing device.

Given the above, the design and manufacture of implementations of the subject matter and the operations described in this specification can be realized using digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or other manufacturing technology.

The invention claimed is:

1. A centrifugal impeller for a compressor of a turbocharger, the impeller comprising:
   a hub extending along an impeller axis; and
   a blade extending from the hub, the blade defining a pressure surface and a suction surface;
   wherein the pressure surface comprises a concave portion,
   wherein the blade defines a leading edge and a trailing edge, and the pressure surface defines a stream-wise contour extending between the leading edge and the trailing edge, the stream-wise contour defining a stream-wise contour length,
   wherein the concave portion is at least partially positioned within a region extending from a first position of the stream-wise contour to a second position of the stream-wise contour, the first position of the stream-wise contour being spaced from the leading edge by at least around 10% of the stream-wise contour length and the second position of the stream-wise contour being spaced from the leading edge by at most around 90% of the stream-wise contour length, and
   wherein no part of the pressure surface of the blade is concave between the first position of the stream-wise contour and the leading edge and no part of the pressure surface is concave between the second position of the stream-wise contour and the trailing edge.

2. The centrifugal impeller according to claim 1, wherein the first position of the stream-wise contour is spaced from the leading edge by at least 20% or around 30% of the stream-wise contour length and the second position of the stream-wise contour is spaced from the leading edge by at most 70% or 80% of the stream-wise contour length.

3. The centrifugal impeller of claim 1, wherein the first position of the stream-wise contour is spaced from the leading edge by at least 12% of the stream-wise contour length.

4. The centrifugal impeller of claim 1, wherein the first position of the stream-wise contour is spaced from the leading edge by at least 18% of the stream-wise contour length.

5. The centrifugal impeller of claim 1, wherein the first position of the stream-wise contour is spaced from the leading edge by at least 28% of the stream-wise contour length.

6. The centrifugal impeller of claim 1, wherein the second position of the stream-wise contour is spaced from the leading edge by at most 65% of the stream-wise contour length.

7. The centrifugal impeller of claim 1, wherein the second position of the stream-wise contour is spaced from the leading edge by at most 75% of the stream-wise contour length.

8. The centrifugal impeller of claim 1, wherein the second position of the stream-wise contour is spaced from the leading edge by at most 85% of the stream-wise contour length.

9. The centrifugal impeller of claim 1, wherein the concave portion has a maximum depth of approximately 3% of the blade thickness.

10. The centrifugal impeller of claim 1, wherein the concave portion has a maximum depth of approximately 5% of the blade thickness.

11. The centrifugal impeller of claim 1, wherein the concave portion has a maximum depth of approximately 7% of the blade thickness.

12. The centrifugal impeller of claim 1, wherein the distribution of lean angles transitions from a negative direction at the blade-root to a positive direction at the blade-tip, the positive direction being between 4 degrees and 6 degrees.

13. The centrifugal impeller of claim 1, wherein the positive lean angle at the blade-tip is between 7 degrees and 9 degrees.

* * * * *